US010769571B2

(12) United States Patent
Anderson et al.

(10) Patent No.: US 10,769,571 B2
(45) Date of Patent: Sep. 8, 2020

(54) SECURITY AND CONTENT PROTECTION BY TEST ENVIRONMENT ANALYSIS

(71) Applicant: Pearson Education, Inc., New York, NY (US)

(72) Inventors: Gregory Anderson, Wakefield, MA (US); Wayne Bailey, Eden Prairie, MN (US); Colleen M. Dolan, Eagan, MN (US); Jide Fajobi, New York, NY (US); Darrick Jensen, Minneapolis, MN (US); Ronald D. Lancaster Jr., St. Paul, MN (US); Matthew Maloney, Boston, MA (US); Michael Nealis, North Aurora, IL (US); Steven C. Nordberg, Bloomington, MN (US); Peter Pascale, Edina, MN (US); Andrew Stockinger, Bloomington, MN (US)

(73) Assignee: PEARSON EDUCATION, INC., New York, NY (US)

( * ) Notice: Subject to any disclaimer, the term of this patent is extended or adjusted under 35 U.S.C. 154(b) by 284 days.

(21) Appl. No.: 15/939,052

(22) Filed: Mar. 28, 2018

(65) Prior Publication Data
US 2019/0197247 A1    Jun. 27, 2019

Related U.S. Application Data

(60) Provisional application No. 62/610,859, filed on Dec. 27, 2017.

(51) Int. Cl.
*H04L 29/06* (2006.01)
*G06Q 10/06* (2012.01)
(Continued)

(52) U.S. Cl.
CPC ........ *G06Q 10/0635* (2013.01); *G06F 9/546* (2013.01); *G06F 11/3438* (2013.01);
(Continued)

(58) Field of Classification Search
CPC ....... G06Q 10/0635; G06Q 10/063118; G06Q 10/06315; G06Q 30/0283; G06Q 50/20;
(Continued)

(56) References Cited

U.S. PATENT DOCUMENTS 6,256,737 B1    7/2001    Bianco et al.
9,336,268 B1    5/2016    Moudy et al.
(Continued)

*Primary Examiner* — Michael S McNally
(74) *Attorney, Agent, or Firm* — Quarles and Brady LLP

(57) ABSTRACT

A system includes a candidate client device including a processor, a camera, and a microphone. The system includes one or more server hardware computing devices communicatively coupled to a network and in communication with the candidate client device. Each of the one or more server hardware computing devices includes at least one processor executing specific computer-executable instructions within a memory that, when executed, cause the one or more server hardware computing devices to receive the sequence of images and the audio data from the candidate client device, extract a first video attribute from the sequence of images, extract a first audio attribute from the audio data, determine that at least one of the first video attribute violates a first video condition and the first audio attribute violates a first audio condition, and prevent the candidate client device from performing a candidate evaluation function using candidate evaluation software application.

18 Claims, 11 Drawing Sheets

(51) Int. Cl.
| | | |
|---|---|---|
| *G06Q 50/20* | (2012.01) | |
| *G06F 21/31* | (2013.01) | |
| *G06F 11/34* | (2006.01) | |
| *G06Q 30/02* | (2012.01) | |
| *G09B 7/07* | (2006.01) | |
| *G06F 21/32* | (2013.01) | |
| *G09B 7/00* | (2006.01) | |
| *G06F 21/60* | (2013.01) | |
| *G06K 9/00* | (2006.01) | |
| *G10L 25/03* | (2013.01) | |
| *H04L 29/08* | (2006.01) | |
| *G06F 21/57* | (2013.01) | |
| *G09B 7/02* | (2006.01) | |
| *H04N 7/18* | (2006.01) | |
| *G06F 9/54* | (2006.01) | |
| *H04N 7/15* | (2006.01) | |
| *G10L 25/51* | (2013.01) | |

(52) U.S. Cl.
CPC ............ *G06F 21/31* (2013.01); *G06F 21/32* (2013.01); *G06F 21/577* (2013.01); *G06F 21/604* (2013.01); *G06K 9/00744* (2013.01); *G06Q 10/06315* (2013.01); *G06Q 10/063118* (2013.01); *G06Q 30/0283* (2013.01); *G06Q 50/20* (2013.01); *G06Q 50/205* (2013.01); *G09B 7/00* (2013.01); *G09B 7/02* (2013.01); *G09B 7/07* (2013.01); *G10L 25/03* (2013.01); *H04L 63/06* (2013.01); *H04L 63/08* (2013.01); *H04L 63/102* (2013.01); *H04L 63/107* (2013.01); *H04L 65/1069* (2013.01); *H04L 67/18* (2013.01); *H04L 67/32* (2013.01); *H04L 67/42* (2013.01); *H04N 7/15* (2013.01); *H04N 7/18* (2013.01); *G06F 2221/2139* (2013.01); *G10L 25/51* (2013.01)

(58) Field of Classification Search
CPC ... G06Q 50/205; G06F 9/546; G06F 11/3438; G06F 21/31; G06F 21/32; G06F 21/577; G06F 21/604; G06F 2221/2139; G06K 9/00744; G09B 7/00; G09B 7/02; G09B 7/07; G10L 25/03; G10L 25/51; H04L 63/06; H04L 63/08; H04L 63/102; H04L 63/107; H04L 65/1069; H04L 67/18; H04L 67/32; H04L 67/42; H04N 7/15; H04N 7/18

USPC .......................................................... 726/2
See application file for complete search history.

(56) References Cited

U.S. PATENT DOCUMENTS

| | | | |
|---|---|---|---|
| 9,432,361 B2 * | 8/2016 | Mahaffey | H04L 63/0853 |
| 9,477,825 B1 * | 10/2016 | Sinchak | G06F 21/6218 |
| 10,148,631 B1 * | 12/2018 | Sokolov | G06F 21/552 |
| 10,198,516 B2 | 2/2019 | Chadha et al. | |
| 10,290,199 B2 | 5/2019 | Kumar et al. | |
| 2002/0029160 A1 | 3/2002 | Thompson et al. | |
| 2002/0055870 A1 | 5/2002 | Thomas | |
| 2004/0229199 A1 | 11/2004 | Ashley et al. | |
| 2005/0008998 A1 | 1/2005 | Munger | |
| 2005/0086498 A1 | 4/2005 | Hulick | |
| 2005/0227216 A1 | 10/2005 | Gupta | |
| 2005/0255438 A1 | 11/2005 | Manos | |
| 2006/0274758 A1 | 12/2006 | Busko et al. | |
| 2007/0048723 A1 | 3/2007 | Brewer et al. | |
| 2008/0050715 A1 | 2/2008 | Golczewski et al. | |
| 2009/0177535 A1 | 7/2009 | Vogt et al. | |
| 2011/0207108 A1 | 8/2011 | Dorman | |
| 2011/0223576 A1 * | 9/2011 | Foster | G09B 7/02 434/362 |
| 2012/0077177 A1 * | 3/2012 | Foster | G09B 7/02 434/362 |
| 2012/0244508 A1 | 9/2012 | Katz | |
| 2014/0093857 A1 | 4/2014 | Simmons | |
| 2014/0222806 A1 | 8/2014 | Carbonell et al. | |
| 2014/0227673 A1 | 8/2014 | Housef | |
| 2014/0282877 A1 * | 9/2014 | Mahaffey | H04L 63/0853 726/3 |
| 2014/0315181 A1 | 10/2014 | Frempong et al. | |
| 2015/0089376 A1 | 3/2015 | Slapp, III | |
| 2016/0026640 A1 | 1/2016 | Hart et al. | |
| 2016/0042654 A1 | 2/2016 | Fieldman | |
| 2016/0055327 A1 | 2/2016 | Moran et al. | |
| 2016/0086134 A1 | 3/2016 | Schwab | |
| 2016/0225278 A1 | 8/2016 | Leddy | |
| 2016/0337863 A1 * | 11/2016 | Robinson | H04W 12/08 |
| 2017/0229033 A1 | 8/2017 | Saini et al. | |
| 2018/0225982 A1 | 8/2018 | Jaeh et al. | |
| 2018/0232830 A1 | 8/2018 | Dorenkamp et al. | |
| 2018/0324228 A1 | 11/2018 | Hasegawa et al. | |
| 2018/0351956 A1 * | 12/2018 | Verma | H04W 12/08 |
| 2019/0088153 A1 | 3/2019 | Bader-Natal et al. | |
| 2019/0139431 A1 * | 5/2019 | Gordon | H04N 7/188 |
| 2019/0163807 A1 | 5/2019 | Jain et al. | |
| 2019/0253269 A1 * | 8/2019 | Keane | H04L 63/20 |

* cited by examiner

SECURITY AND CONTENT PROTECTION BY TEST ENVIRONMENT ANALYSIS

CROSS-REFERENCE TO RELATED APPLICATIONS

This application claims priority to U.S. Provisional Patent Application No. 62/610,859 entitled "SYSTEMS FOR ONLINE PROCTORING PLATFORM" and filed on Dec. 27, 2017.

FIELD OF THE INVENTION

This disclosure relates to the field of systems and methods configured to implement an electronic platform that enables a testing service provider to establish a secure, proctored online testing environment for remote users.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to implement an online proctoring system.

The features and advantages of the present invention will be better understood from the following detailed description taken in conjunction with the accompanying drawings.

DETAILED DESCRIPTION

Figure 1A:
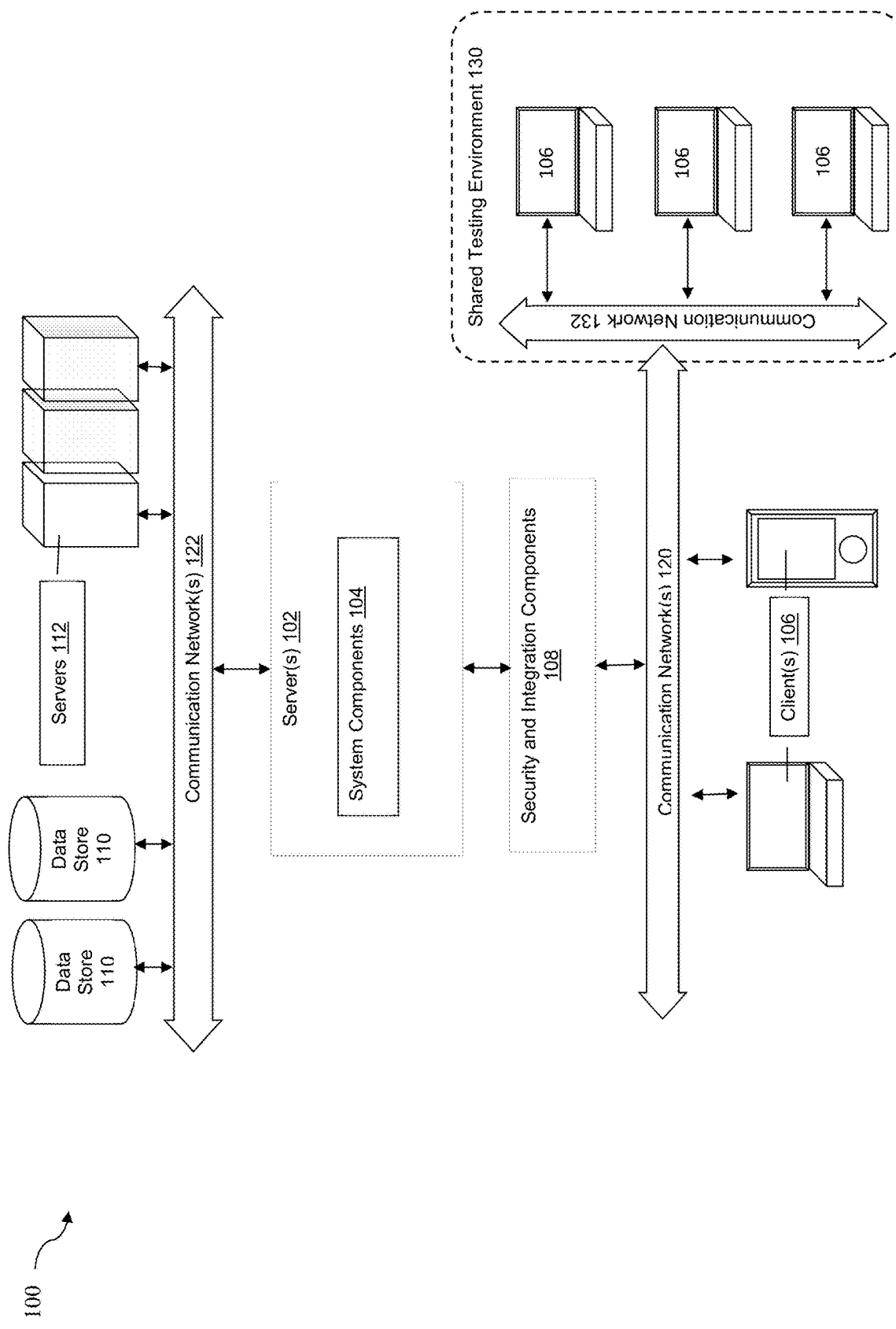
FIGS. 1A and 1B are system level block diagrams for an example embodiment of a distributed computing environment implementing an online proctored examination platform in accordance with the present disclosure.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A "proctored examination" is an evaluation routine, such as a test (e.g., taken by an individual subscribing to an evaluation service, such as a student for a class) that is administered to test-takers in a secure, monitored environment, so as to prevent, deter, catch, or minimize cheating. Commonly, one or more "proctors" secure the environment and administer the test, for example by: validating the test-takers, such as by checking identification; clearing the environment of unnecessary materials; releasing test materials to the test-takers; keeping the test time; monitoring test-takers during the test for erratic behavior; stopping the test when time has elapsed; and collecting and securing completed test materials. The introduction and proliferation of internet-based and other online coursework has posed the challenge of implementing proctored examinations online, when test-takers as well as the proctors themselves are using many different types of computer systems from disparate, physically separated locations to access online testing materials remotely.

The present systems and methods provide innovations to the processes, technical system architecture, security, and user experience of a digital platform for administering online proctored examinations. Non-limiting examples of the platform functionality addressed by the present disclosure include: using the platform to provide a test-taker access to a suitable testing environment and computing hardware; registration and greeting processes, where a test-taker's identify is verified, his computer system is checked and placed into test-taking mode, and his testing environment is secured; providing test materials and receiving answers to test questions; evaluating a cheating risk associated with the test-taker and using the results to configure system actions and interactions with the test-taker; identifying a proctor and connecting the proctor's computer system to the test-taker's; monitoring the test-taker, including with automated means as well as tools for proctor monitoring; and, performing analysis of data collected during the examination.

FIG. 1A illustrates a non-limiting example distributed computing environment 100, which implements the online proctoring platform of the present disclosure. The distributed computing environment 100 includes one or more computer server computing devices ("servers") 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model, scalable virtual server model, "serverless" virtual machine allocation model, peer-to-peer computing model, or any other distributed computing architecture or combination of architectures.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100. For example, the distributed computing system 100 may implement a content distribution network in which server computing device(s) 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

A client device 106 may be any suitable hardware computing device capable of executing program instructions embodied in the software applications and/or application interfaces operable to provide the platform's functions to the client device 106. Personal desktop, laptop, thin-client, tablet, and similar computers, as well as smartphones and other mobile devices with sufficient computing power and network connectivity, are examples of such hardware computing devices. The client device 106 may further include hardware and associated software components used for certain platform functions. For example, client devices 106 used at least by test-takers, and in some embodiments also those used by proctors and other administrators, may require a webcam or other image capture device that captures images and/or video of the client device 106 user and his immediate surroundings. The client device 106 may include other input/output devices, such as a keyboard and mouse or touchpad, microphone, speakers, and fingerprint or other biometric sensors.

In accordance with FIG. 1A, some of all of the client devices 106 that can access the online proctoring platform (i.e., via communication network 120) may be physically remote from the server 102 as well as from each other. Additionally or alternatively, in some embodiments one or more shared testing environments 130 may be registered on the platform. A shared testing environment may be a physical or virtual environment containing a plurality of co-located client devices 106. For example, the shared testing environment 130 may be associated with a brick-and-mortar testing center that is staffed, in person and/or virtually, with proctors and administrative staff. In some embodiments, "co-located" means the communication devices 106 are configured to communicate over a private network 132, such as a LAN, that is configured to connect to the server 102 (e.g., via the communication network 120); the client devices 106 can further be physically co-located, such as in adjacent cubicles in a testing center.

The client devices 106 of FIG. 1A represent devices used by any type of user to access the platform, which types may include, without limitation: a test-taker having an authorized user account; an agent of the test-taker, such as an aide to a disabled candidate; a new or unregistered user; a proctor having an authorized user account; and administrative staff, such as system administrators, agents of the service provider, testing site managers, greeters, support staff, and the like. Each client device 106 may have unique or additional system requirements and/or configurations depending on the type of user that is using the client device 106 to access the platform. Various examples of this are described herein with respect to the present systems and methods.

Various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users. For example, security and integration components 108 may be configured to facilitate identification of the user of a client device 106, such as when a valid testing candidate or a bad actor is attempting to connect to a proctor or to access testing resources. In another example, security and integration components 108 may, directly and/or via the server 102, access data (e.g., stored in back-end servers 112) that has been or can be used to establish a trust score for a platform user, as described further below. As non-limiting examples, these security components 108 may comprise dedicated hardware, specialized networking components, and/or software (e.g., web servers, authentication servers, firewalls, routers, gateways, load balancers, etc.) within one or more data centers in one or more physical locations and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the distributed computing environment 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with the server(s) 102 via one or more networks 122, which may be any suitable communication network as described above with respect to communication network 120. In some embodiments, the network 122 may be contained within a virtual computing environment, and may communicate encrypted information, such as over a TLS-encrypted channel. In some cases, one or more data stores 110 may reside on a non-transitory storage medium within the server 102. In certain embodiments, data stores 110 and back-end servers 112 may reside in a storage-area network (SAN). In some embodiments, back-end servers 112 may include computing components, software applications, virtual machines or other specially allocated computing resources, and the like, which implement particular functions of the online proctoring platform. The server 102 may send data to the back-end servers 112 for processing, and may receive the results of such processing. For example, a back-end server 112 may be configured to perform facial recognition or other image processing for identifying a user; the server 102 may collect images from an imaging device of the client device 106 and send the images to the back-end server 112 for verification that the person depicted in the images is the authenticated user. Access to certain data stores 110 and/or back-end servers 112 may be limited or denied based on the processes, user credentials, and/or devices attempting to access them.

Figure 1B:
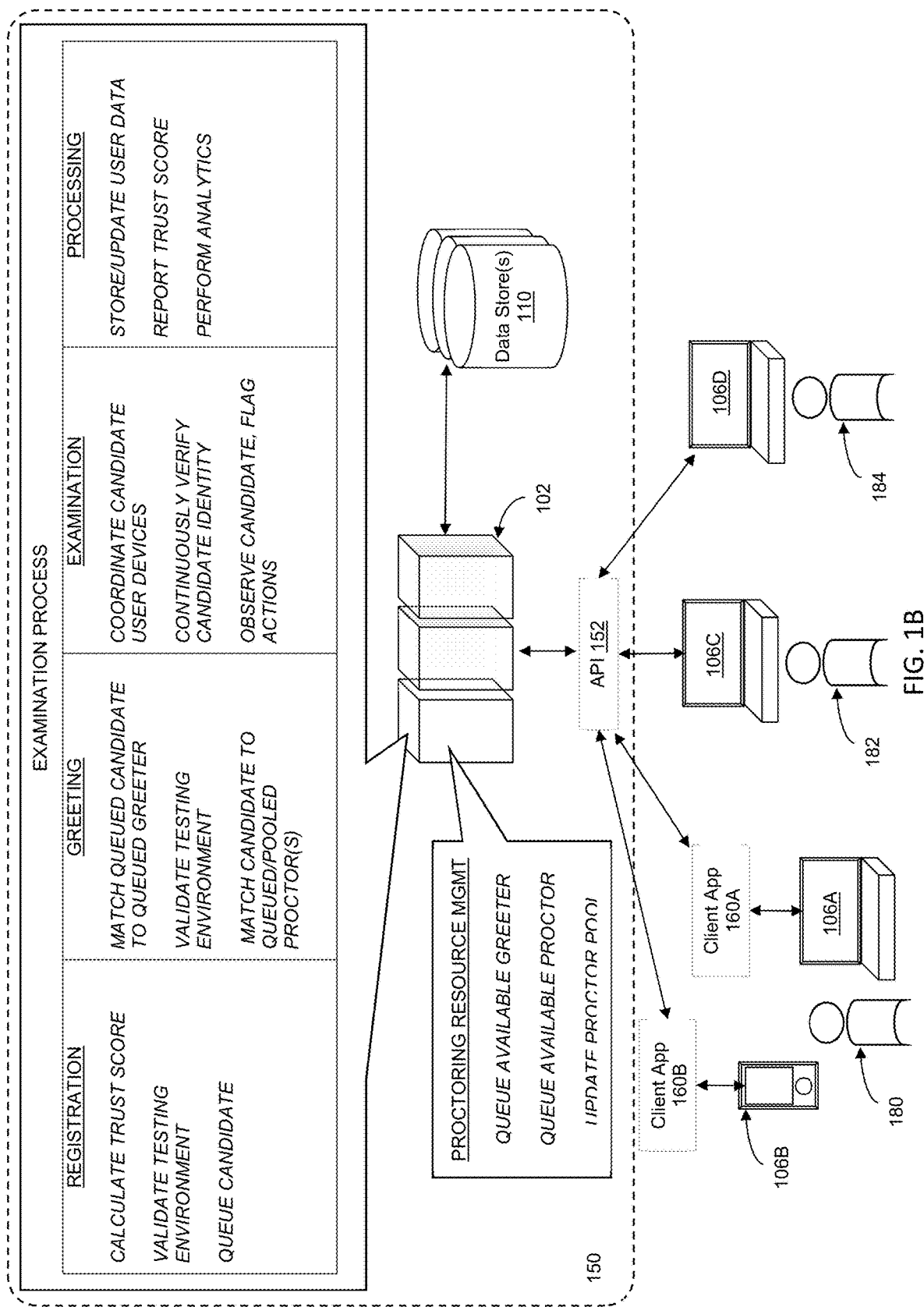

The systems and methods described herein may use, or be implemented on, the computing infrastructure described in FIG. 1A (and computing devices described in FIG. 2) in order to provide an online proctoring platform having security, content protection, transaction processing, and data analytics features that improve the test-taking experience for both candidates and proctors, the efficiency of the platform, and the validity of the test results, among other improvements. Such features, implemented in computing hardware and/or software, can affect all phases of the examination process; FIG. 1B illustrates the examination process and provides context for the functionality of an online proctoring platform 150 described herein.

The phases of the online proctored examination process include candidate user registration, "greeting" between the candidate and a greeter, proctored examination and monitoring, and processing of test answers and results. In the registration phase, the platform 150 confirms the identity and credentials of the candidate user and registers (or confirms registration of) the candidate user's devices for use within the platform 150. The present platform 150 may additionally calculate a trust score for the candidate, validate the testing environment using automated procedures, and place the candidate user in a queue during the registration phase, as described further below.

In the greeting phase, the platform 150 connects the candidate user to a "greeter," which may be an administrative user or a proctor user of the platform 150. The connection may be established, for example, via at least one of a video and/or an audio connection established between the candidate's computing device and a computing device of the greeter, administrator, or proctor's computing device. The greeter may provide examination materials and/or instructions to the candidate, answers any questions, and may also perform visual observation of the testing environment to validate that the environment is suitable. The present platform 150 may additionally queue available greeters/proctors and match a greeter/proctor to the candidate user based on compatibility metrics and/or availability (e.g., within a proctor pool), and may further validate the testing environment with additional automated procedures, during the greeting phase as described further below.

In the examination phase, the platform 150 connects the candidate user to one or more proctors (i.e., the matched proctors from the greeting phase) that monitor the candidate user during the examination. The platform 150 then facilitates the examination, such as by sending exam questions to the candidate user's devices and receiving input answers in return. The present disclosure describes platform 150 functionality for coordinating input and output across multiple candidate devices, continuously verifying the candidate's identity, and observing the candidate and flagging aberrant behavior or actions, during the examination phase. Once the exam is complete, the examination process enters the processing phase, where the platform 150 stores and updates user data, reports the candidate's trust score, and performs analytics on collected data as described below.

FIG. 1B illustrates an example online proctor platform 150 implemented in the distributed computing environment of FIG. 1A. The servers 102 may communicate with the data stores 110 and other components of the platform 150 to provide an examination process to users connecting to the platform 150, such as through an application programming interface (API) 152 or another interface facilitating communication between the servers 102 and connecting client devices. A candidate user 180 may access the platform 150 using one or more client devices 106A,B in order to take an exam; a proctor user 182 and an administrative user 184 may access the platform 150 using their respective client devices 106C, 106D.

Some of all of the candidate user's 180 client devices 106A,B may be specially configured to emulate a testing environment. In some embodiments, a client software application 160A,B may be installed and executed on the client device(s) 106A,B when the candidate user 180 logs onto the platform 150 or initiates the examination process. The client software application 160A,B may include software modules that, among other functions: disable other software programs; take exclusive control of network interfaces, and disable communication functionality that is unnecessary for communicating with the platform to reduce the likelihood of unauthorized communications; establish a secure communication channel with the platform; and, enable and take exclusive control of the client device's components and peripherals for capturing audio and video (to produce the candidate user's video feed and prevent unauthorized recordings), playing back audio, and collecting biometric data. The platform software thus secures control of the client device to an extent that secures the examination process.

Figure 2:
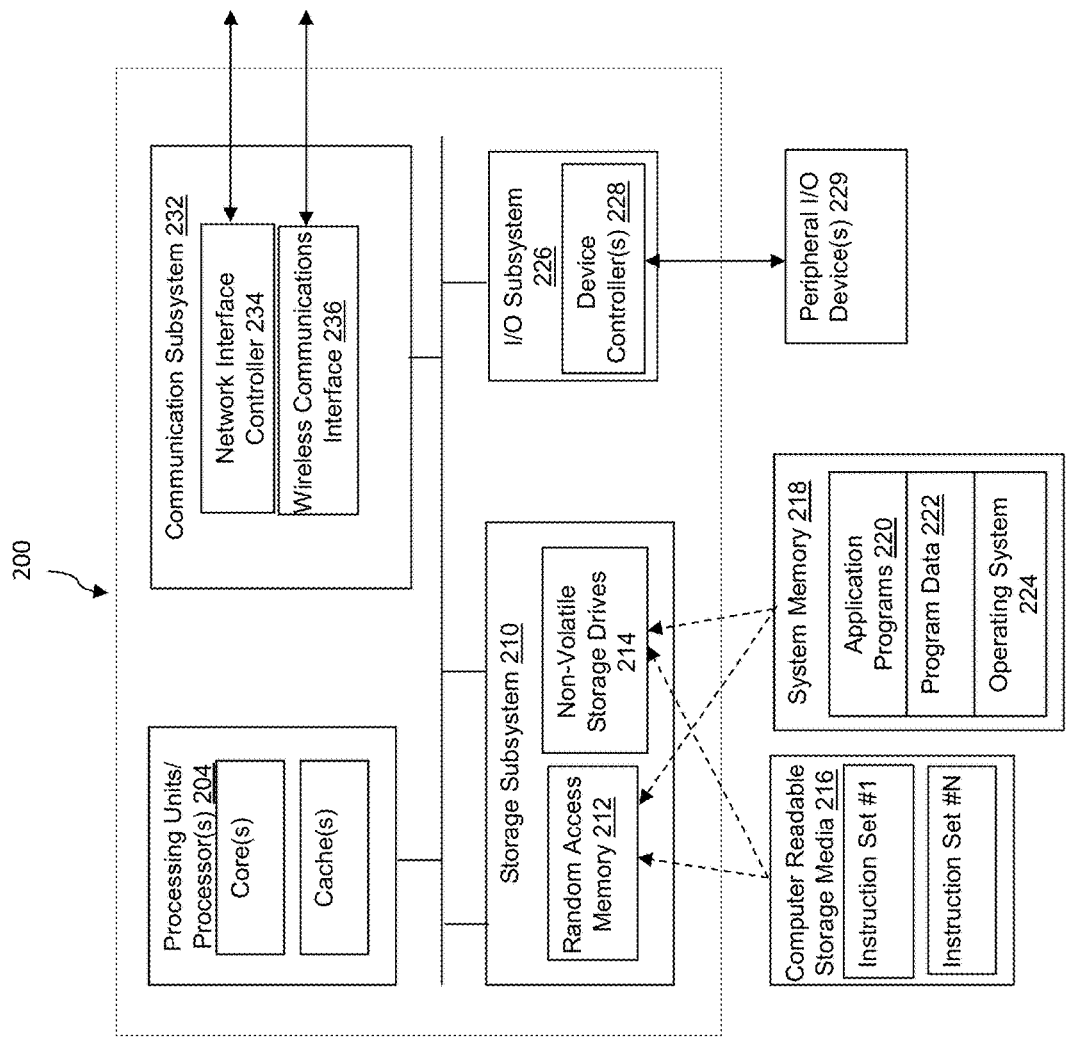
FIG. 2 is a system level block diagram for an example computing device in an online proctored examination platform in accordance with the present disclosure.

With reference now to FIG. 2, a block diagram of an illustrative computer system 200 is shown. The computer system 200 may correspond to any of the computing devices or servers of the distributed computing environment 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional micro-processor or microcontroller), and controls the operation of computer system 200. These processors may include single core and/or multicore (e.g., quad core, hexa-core, octo-core, ten-core, etc.) processors and processor caches. These processing units 204 may execute a variety of resident software processes embodied in program code, and may maintain multiple concurrently executing programs or processes. Processing units 204 may include specially-configured CPUs as well as one or more specialized processors, (e.g., digital signal processors (DSPs), outboard, graphics application-specific (e.g., GPUs), and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices 229 which are attachable/detachable from the computer system 200. Input may include signal input such as keystroke or mouse input, audio input (e.g., spoken commands), video input (e.g., from a webcam), motion sensing, gesture recognition (e.g., eye gestures), etc. As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216. System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc. System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204. System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer-readable storage media 216 may store the basic programming and data constructs that provide the functionality of some embodiments. Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210. Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 232 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

The present systems and methods for implementing an online proctoring platform may employ security approaches that verify user identities and credentials, connecting computer devices (e.g., client devices 106 of FIG. 1), data input into the platform, and the like. In particular, the present system enables the platform to conduct a more comprehensive analysis of risk (e.g., cheating risk or identity or intellectual property theft risks, or other fraud risks) posed by a user based upon a combination of "internal" and "external" risk factors. This risk analysis can be used by the platform throughout the examination process; in addition, data collected during the examination process can inform the risk analysis of a particular user. The platform may, in some embodiments, generate a trust score representing the results of this risk analysis as described below.

Generally, "internal" risk factors of the risk analysis may be evaluated based on data that is internal to the platform. Internal data may include in situ information provided by the user, such as webcam input or images depicting the user, input data such as driver's license information or other identification documents, user account credentials, user device information, and the like, which the system can compare to itself (e.g., matching a driver's license photo to webcam input to verify identity) and/or to user records and other information internal to the platform. Internal data may additionally or alternatively include the user records and other internal information, such as historical and current platform usage data. Generally, "external" factors may be evaluated based on data related to the user and obtained from data sources outside of the platform, such as public records databases, school records, social media networking services, and the like. Responsive to a request to perform the risk analysis and/or to calculate a trust score for a particular user, the system may determine whether the user is a candidate user, a proctor user, or an administrator user, and may configure the collection of data according to the user type. For example, data that is internal to the platform and describes the user's usage of the platform may include historical candidate data describing performance on completed examinations for a candidate user, while such internal data for a proctor user may include historical proctor data describing the proctor user's performance while proctoring past examinations.

Figure 3:
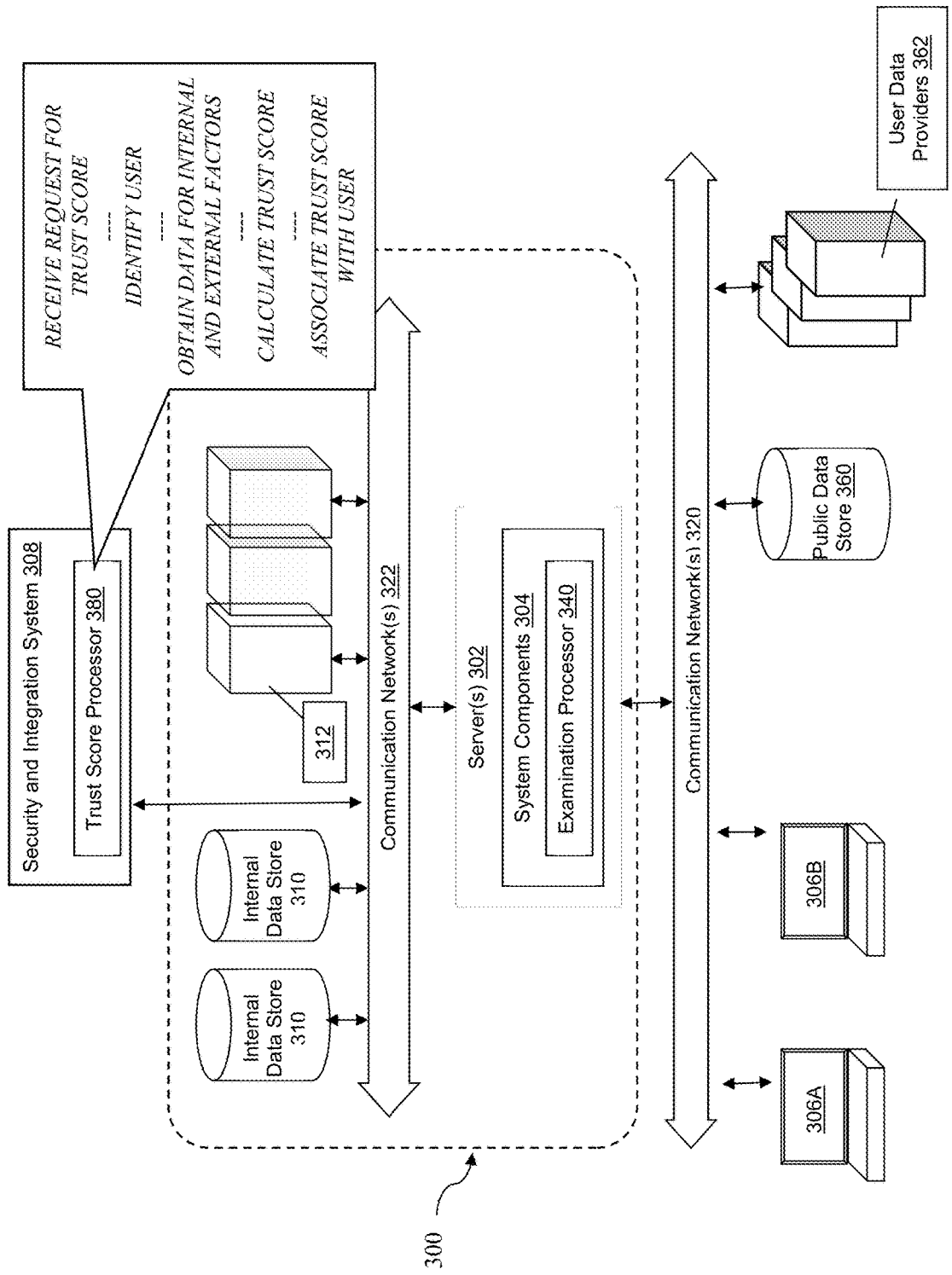
FIG. 3 is a system level block diagram of another example embodiment of an online proctored examination platform that generates trust scores for users, in accordance with the present disclosure.

FIG. 3 depicts an example distributed computing environment, such as the environment 100 of FIG. 1, in which an online proctored evaluation or examination platform 300 is implemented by one or more servers 302 having system components 304, one or more internal data stores 310 residing on the servers 302 or accessible by the servers 302 via a communication network 322, and one or more back-end servers 312 in communication with the servers 302 via the communication network 322, each operating as described above with respect to FIG. 1. The system components 304 may include an examination processor 340 that controls and executes the examination process for one or more users connected to the platform 300. The examination processor 340 or another of the system components 304 may communicate with a security and integration system 308 having security and integration components as described above. In one embodiment, the security and integration system 308 may be implemented (e.g., on one or more servers) in the distributed computing environment but outside of the platform 300; the security and integration system 308 may be used by multiple systems including the platform 300 and other testing systems. In another embodiment, the security and integration system 308 may be implemented within the platform 300, its components and functionality provided in dedicated or distributed fashion on the server 302, the back-end server(s) 312, or another hardware computing device of the platform 300. The server 302 may use communication network 322 and/or other networks to communicate with the security and integration system 308 (e.g., via in API). In one embodiment, the security and integration system 308 may include a trust score processor 380. The trust score processor 380 acquires data related to the internal and external factors of the risk analysis, computes trust scores based on one or more algorithms for evaluating the risk posed by a candidate, a proctor, or another platform user, and stores the trust scores or delivers them to other system components 304 that use them.

One or more of the internal data stores 310 and/or one or more of the back-end servers 312 may store data internal to the platform that the trust score processor 380 obtains, such as by querying the relevant computing devices or by receiving the data from the server 302. Non-limiting examples of internal data that the platform may generate and store in the internal data stores 310 and/or the back-end servers 312 include user account information, historical candidate data describing a candidate user's past performance on examinations and/or past analysis of the user's behavior, historical proctor data describing a proctor user's past performance, historical data relating to examinations, such as aggregated test results and other parameters, previously-calculated trust scores, platform performance parameters such as number and frequency of users, and other platform-generated data. One or more of the back-end servers 312 may be configured to perform various desirable forms of analysis of platform-generated data to produce internal data relevant to the trust score. For example, a back-end server 312 may have executable program instructions for obtaining aggregate completed examination data and using the data to determine usage patterns of completed examinations and identify, as internal data, frequencies at which certain examinations are taken together by the same candidate user.

The trust score processor 380 may further obtain internal data from the device with which the user accesses the platform. For example, a client device 306A (as described above with respect to FIG. 1) used by a testing candidate to access the platform (e.g., via communication network 320) may, during communications with the examination processor 340 or other system components 304, send to the server 302 internal data such as images and other files, sensor (e.g., fingerprint or other biosensor) input data, user input (e.g., typed words; form data posted by a browser application), software information such as type and version of browser, device data such as make, model, and connected peripherals of the client device 306, and the like. Similar internal data for assessing risk associated with a proctor user may be collected from the proctor user's client device 306B. In some embodiments, internal data used to calculate a trust score for a candidate user may be obtained from the client device 306B of a proctor user, such as when the proctor user used the client device 306B to proctor an examination taken by the candidate user and enters evaluation data and other feedback related to the candidate user. The reverse may also be true: the candidate user may use his client device 306A to enter evaluation data related to his proctor and used by the trust score processor 380 to generate a trust score for the proctor user. The trust score processor 380 may receive this internal data once it is received by the server 302 and, optionally, verified by system components 304 and/or other security and integration components 308. Alternatively, this internal data may be stored (e.g., in an internal data store 310) and the trust score processor 380 may retrieve the desired internal data from its storage location.

The platform 300, via the server 302 or another computing device, may be in communication (e.g., over one or more communication networks 320) with one or more external data sources that are outside of the platform 300 and contain data used to calculate a trust score. Non-limiting examples of such external data sources include: one or more public data stores 360 containing publicly available information, such as court records, motorist records, law enforcement records, electronic publications, and the like; and, one or more user data providers 362, such as a social media networking service, a school records information service, and any other data providers that may store or have access to public, semi-private, and/or private information about the user. The trust score processor 380 may query public data stores 360 for desired external data used to calculate the trust score. Similarly, the trust score processor 380 may access or communicate with a user data provider 362 to obtain such external data. In some embodiments, a user may provide the platform 300 with login credentials or another form of authorization that enables the trust score processor 380 to obtain private external data, such as social media activity or school transcripts, from the corresponding user data provider 362. In another embodiment, one or more of the back-end servers 312 may be configured to obtain external data from one or more of the external data sources, and may store the external data for retrieval or may send the external data to the trust score processor 380.

The trust score may, in some embodiments, be a numerical value falling within a predefined range. A trust score for a user may be computed or re-computed/updated at predetermined intervals and/or when a triggering action occurs. Non-limiting examples of such triggering actions include: the user creating an account, initiating and/or completing the examination process, or otherwise providing user input that triggers the platform to compute the trust score; the platform receiving data related to the user from an external data source; or, the platform receiving a request for a new trust score. As shown in FIG. 3, upon receiving a request or other indication to generate a trust score for a user, the platform may: identify the user (e.g., using a user identifier or device identifier provided in the request); retrieve the previous trust score associated with the user, if any; obtain the internal and external data used to calculate the trust score; calculate the trust score; and, associate the trust score with the user by storing the trust score in the user's account or sending it to other platform components as described herein.

The trust score can be calculated from any available data related to the internal and external factors considered by the platform 300 in assessing risk associated with a platform user. Various embodiments may use some or all of the following non-limiting data examples. In some embodiments, as described above, the internal data may include historical data records that are associated with a user (e.g., candidate) of the system. In one embodiment, the system, authorized by the user to access a social networking platform or to communicate with a user data provider that manages access to the social networking platform, may obtain information from a user profile of the user on the social network. An analysis of the user's social networks may identify connections to high-risk users (e.g., other users of the social network that themselves have been associated with a relatively low trust score), which would lower the trust score. The system may identify the high-risk candidate users of the platform that have a trust score below a certain threshold, determine whether the user's user profile identifies any of the high-risk candidate users as connections to the user on the social network, and deduct a certain amount from the user's trust score for each connection that is a high-risk candidate user (or may increase the trust score if none of the high-risk users are connections). Historical data from external data sources hosting publicly available data or private or semi-private data may identify high-risk behavior (that lowers the trust score) or low-risk behavior (that raises the trust score), such as the presence or lack of reported police incidents involving the user. Thus, in one embodiment, a law enforcement records database may make available its public records in which the name or other identifying information of the user appears, or more narrowly, the public records for crimes in which the user is identified as the perpetrator, or even more narrowly, the public records for fraud crimes, theft, or identity theft that identify the user as the perpetrator. In another embodiment, the system, authorized by the user to communicate with a user data provider that manages secured access to electronic education records, may request and receive course records describing courses the user has taken and the user's performance therein. Low or failing grades or incomplete coursework may lower the trust score, while high grades in completed coursework data retrieved from an external source of schooling records may raise the trust score. Historical candidate data generated and/or stored by the platform 300, such as the candidate user's performance on previous examinations using the platform 300 may impact the trust score: an increasing number of retaken examinations, or the candidate completing an examination over a first duration (i.e., length of time to complete the exam) that is a certain percentage or amount outside of a mean or median time frame or duration for completion by all candidates, or the candidate taking sets of exams not usually taken together (e.g., medical and financial planning exams), or the candidate failing to progress through a set of progressive examinations (e.g., a set of professional development exams), or the platform 300 having identified cheating or high-risk behavior in the past, may all lower the trust score. In contrast, historical candidate data may also indicate low-risk behavior; determining that the candidate user completed an examination over a duration that is within five percent, for example, of the mean or median duration may cause the system to increase the trust score. A candidate user's performance during an examination on the platform 300 may impact the trust score in real-time: in skills-based testing, for example, the platform 300 may analyze user input, such as a video feed, keystrokes, mouse usage, submitted data, and the like, to evaluate the candidate's behavior and lower the trust score upon identification of 1) high-risk behavior, such as unusual or repetitive movements or the use of unauthorized supporting devices, that may reduce the trust score, or 2) attributes indicating the identity of the candidate is in question (e.g., the candidate's body movements do not match those of a previous exam). The trust score may be lowered by the platform directly, or the platform may generate a behavior alert indicating that high-risk or identity-disputing behavior was detected in the user input, and the system may receive the behavior alert or information describing the behavior alert and may lower the trust score in response. The system, in some embodiments, may obtain information describing the user input collected during the examination process, the information being necessary to calculate the trust score, substantially in real-time as the user input is collected, and may perform the risk analysis and update the trust score also in real-time or near-real time. The system may also perform actions related to the updated trust score in real time. For example, the system may determine that the update to the trust score caused the trust score to fall below a threshold that indicates an additional proctor is required, and the system may cause another proctor to be assigned to the examination. The candidate user's choice of client device 306A or software may also be a factor—older or less secure computers, low resolution and low framerate webcams, and similar substandard equipment may lower the trust score. In one embodiment, the system may compare particular device attributes to a set of minimum device requirements, such as a minimum processor speed, minimum amount of onboard memory, minimum specifications (e.g., resolution, frame rate) of an imaging device, required communication network or networking protocol, required browser or other software application, required version of the client software application for the platform 300, and the like. The system may produce a device security evaluation from the comparison, and may lower the trust score if the device security evaluation indicates that the user's client device (or one or more attributes thereof) does not meet the minimum device requirements.

Table 1 depicts part of an example decision logic stored in memory, and executable by one or more processors, of the system's server hardware computing devices to perform the risk analysis (i.e., calculate a trust score) for a candidate user. Similar decision logic for performing the risk analysis for a proctor user may also be stored in the server hardware computing device's memory. The platform 300 may retrieve the candidate user's current (i.e., existing) trust score, representing previous results of the risk analysis of the user, and may retrieve the requisite data from internal and external data sources and identify usage data in the internal and/or external data, the usage data being useful in the decision logic to evaluate the plurality of risk factors associated with the risk analysis. The system may determine which transformations, including without limitation any of the transformations of Table 1 and other transformations describing a change in the risk posed by the user, the change resulting from the user's usage of the online proctored examination platform, to apply to the existing trust score that were not previously applied based on the same usage data (i.e., if the trust score was already reduced based on identified usage data, such as the candidate user being connected to a high-risk user on social media, the platform 300 does not deduct based on that usage data a second time). Candidate users with no existing trust score (e.g., a new user) may be assigned a default starting score (which may, in some embodiments, place the candidate user in a median category between low-risk and high-risk users if unchanged). The platform 300 may then apply the identified transformations to the existing trust score to produce an updated trust score. The platform 300 uses the internal and/or external data and a plurality of risk factors for identifying high-risk behaviors and low-risk behaviors of the user to produce an updated trust score, wherein the system updates the current trust score to represent a lower risk according to identified low-risk behaviors, and the system updates the current trust score to represent a higher risk according to identified high-risk behaviors. For example, the system adds or deducts values according to the equations of Table 1, and then stores the updated trust score (e.g., in the user account data).

TABLE 1

Example Trust Score Calculation Equations

| Data Source | Data | Equation 1 | Equation 2 |
|---|---|---|---|
| Internal - Historical - User | Retakes | For each retake, reduce score by X | |
| Internal - Historical - Global | Exam Length | For each exam > (median length + 25%), reduce score by Y | For each exam within (median length + 5%), increase score by Z |
| Internal - Current - User | Alerts | For each behavior alert, reduce score by A | For each testing environment alert, reduce score by B (B < A) |
| External - Historical - School Records | Grades | For each failed course, reduce score by F | For each incomplete course, reduce score by I |
| External - Current - Social Media | Connections | For each connection to high-risk user, reduce score by H | If no connections to high-risk users, increase score by N |

The platform 300 may associate the calculated trust score with the user, and then use the trust score to modify how the platform 300 interacts with the user. In some embodiments, various functions and requirements may be enabled, disabled, or changed depending upon the user's trust score. For example, the trust score may determine which testing environments are available to the candidate user: candidate users with a trust score above a first threshold are eligible to take exams on their own client device in a testing environment of their choosing, such as from home or another remote location, for example; candidate users with a trust score below another threshold (e.g., lower than the first threshold) are required to take exams in a high-security in-person testing facility. In some embodiments, if a candidate user's trust score is above a predetermined threshold associated with the candidate user being a low cheating or theft risk, the platform 300 may skip or eliminate one or more security procedures performed during the registration and/or greeting phases of the examination process, reducing (possibly significantly) the time and effort required to complete the phase(s). Alternatively, if a candidate user's trust score is above a predetermined threshold, the candidate may be authorized to undergo an automated greeting process (e.g., a test environment validation process) in which greeting is performed, not by a human, and instead via a series of instructions transmitted to the candidate by the platform 300. In such a case, the instructions may enable to platform 300 to gather suitable data about the candidate's testing environment, but, because the candidate is trustworthy, the greeting process can be automated making the process quicker and easier for the candidate. In some cases, the system may reduce the number of identity verifications performed to obtain a "chain of identification" during the examination, as described below, or may eliminate the chain of identification procedure altogether, for candidate users with a sufficiently high trust score. The platform 300 may store settings indicating eligibility for these functions and requirements as data elements of the user account, and further may enable (e.g., via a user interface delivered to the client device 306A) the candidate user to select preferences for these and other examination parameters, where selections are only enabled if the candidate user has the requisite trust score.

Parameters of the examination phase, such as monitoring parameters that control activation, deactivation, and other properties of examination monitoring functions, as well as other examination parameters that configure the examination and/or the testing environment for the user, may also be modified based on the trust score. For example, the platform 300 may use the position of the candidate user's trust score within the range of possible trust scores to set a value for a monitoring parameter that determines the number of proctors that will monitor the examination. If, for example, a candidate's trust score falls below a first threshold, the candidate may only be allocated a single proctor. But, if the candidate's trust score falls below a second threshold (that is lower than the first threshold), the candidate may be allocated two or more proctors as that candidate may present an increased risk. Generally, the number of allocated proctor my increase proportionately with the risk indicated by the trust score, up to a maximum number of proctors. In another example, the platform 300 may implement one or more monitoring functions that require an allocation of computing resources (e.g., networking bandwidth), such as by displaying the candidate user's video feed in a window on the proctor user's client device 306B or bandwidth for a connection between the client devices 306A,B; the system may modify the allocation and/or configuration of computing resources according to the trust score, such as by displaying the candidate user's feed in a larger window if the trust score is low giving the proctor an enhanced view of the candidate and increasing the likelihood of cheat detection, or by increasing bandwidth between the client devices 306A,B to enhance the clarity of the candidate user's video feed on the proctor user's client device 306B so the proctor can better monitor a candidate with a low trust score. Additional examples of using the trust score to customize platform 300 operations are described below.

Figure 4A:
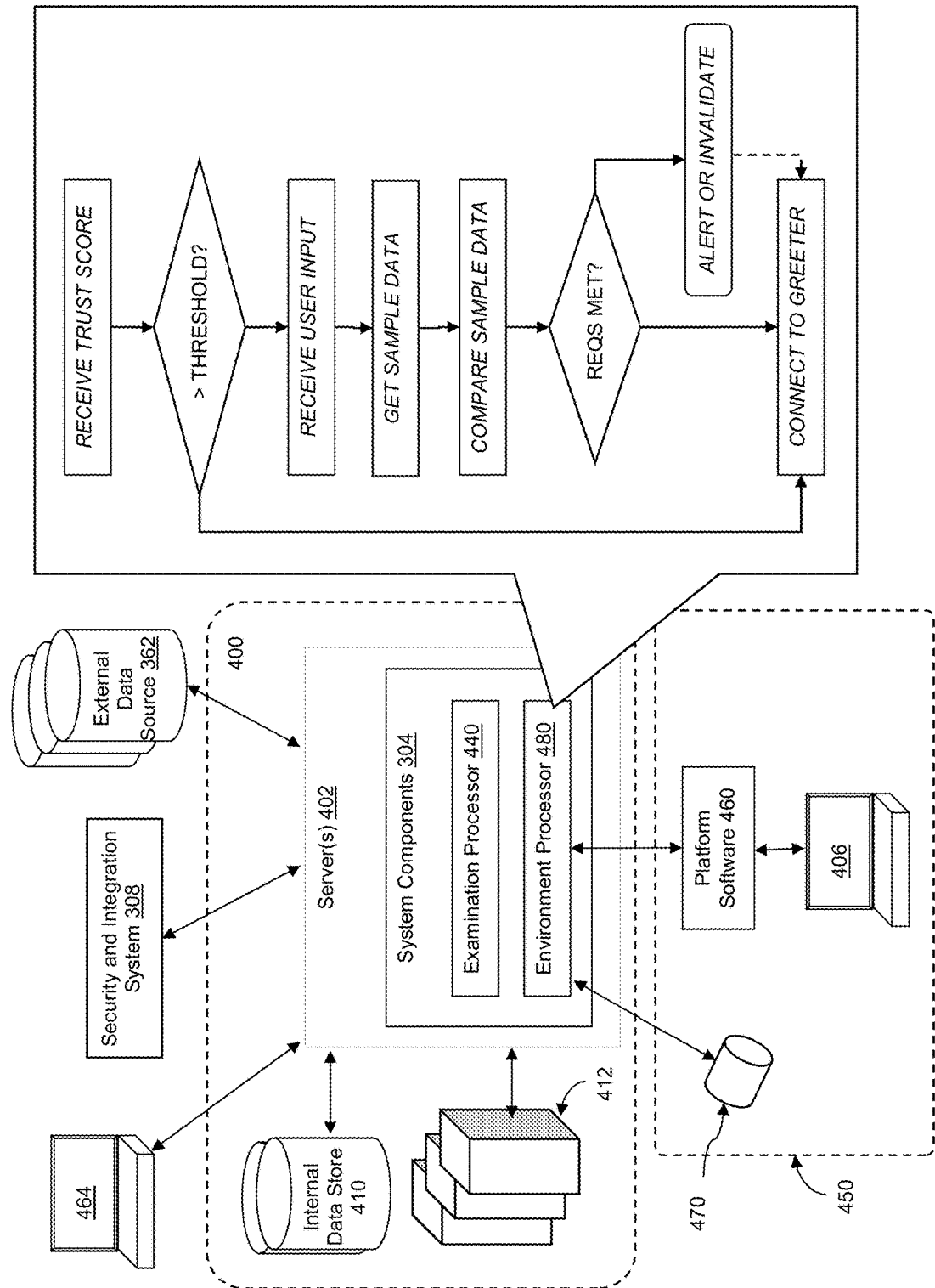
FIGS. 4A and 4B are system level block diagrams of another example embodiment of an online proctored examination platform that performs testing environment validation processes in accordance with the present disclosure.
Figure 4B:
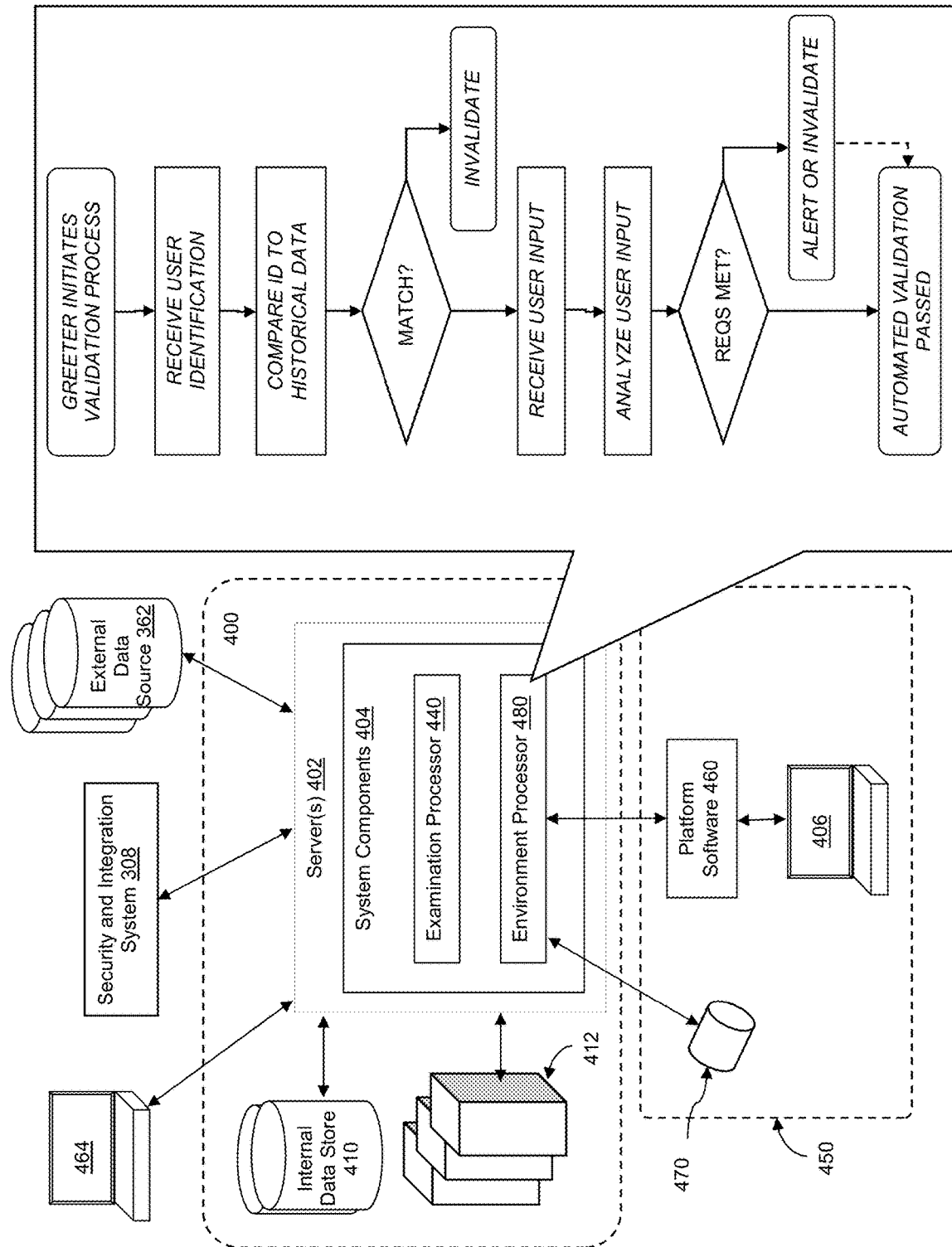

Referring to FIGS. 4A-B, an online proctoring platform 400 in accordance with the present disclosure may perform, and/or may enable one or more administrative or proctor users to perform, testing environment verification procedures in order to confirm that a candidate user attempting to take an exam remotely on a client device 406 is located in a secure, low-risk, and otherwise suitable testing environment 450 for taking the exam. The verification procedures may additionally confirm that the client device's 406 platform software 460 is installed and executing correctly. As above, the platform 400 may be implemented by one or more servers 402 having system components 404, one or more internal data stores 410 residing on or accessible by the servers 402, and one or more back-end servers 412 in communication with the servers 402, each platform 400 element operating as described above with respect to FIG. 1. The system components 404 may include an examination processor 440 that controls and executes the examination process for one or more users connected to the platform 400. In one embodiment, the system components 404 may further include an environment processor 480 for performing automated validation processes on the testing environment 450; alternatively, the functions of the environment processor 480 may be implemented on one or more of the back-end servers 412 in a dedicated or distributed fashion.

As explained above, the proctored online examination process begins with the registration and then the greeting phases. In the registration phase, the candidate user, using the client device 406 he will use for the exam, signs into his platform user account at the scheduled time prior to the exam. The platform 400, with or without input from the user, confirms that the client device 406 is registered with the platform 400 and has the appropriate platform software 460 installed and executing thereon. If either check fails, the platform 400 may refuse to initiate the examination; alternatively, the platform 400 may perform one or more registration procedures for registering the client device 406 and setting up the platform software 460. The platform 400 may then establish a secure connection to the client device 406 and begin receiving the candidate user's video (e.g., from a webcam) and audio (e.g., from a microphone) feeds and other input.

This input may be provided to the environment processor 480 for use in the testing environment validation processes. In some embodiments, the environment processor 480 may first retrieve the candidate user's trust score. In some embodiments, the environment processor 480 or another of the system components 404 may obtain the trust score from the security and integration system 308 implemented inside or outside of the platform 400 as described above. If there is no trust score (e.g., the candidate is new to the system), in some embodiments the environment processor 480 may request that the security and integration system 308 calculate the candidate user's trust score and deliver the score to the environment processor 480. The environment processor 480 may use the trust score to determine which testing environment validation processes to execute. For example, if the trust score is over a certain threshold, the environment processor 480 may reduce the frequency of, or eliminate entirely, analysis of video attributes or sensor data as described below. In turn, the platform 400 may use the results of some or all of the testing environment validation processes to modify the trust score. For example, when the environment processor 480 determines that a video feed from the candidate user's client device depicts a security violation within the user's testing environment, the environment processor 480 may generate a testing environment alert, and the alert or information describing the alert may be received by the system(s) calculating the trust score. Determining that the alert indicates high-risk behavior, the system may lower the user's trust score.

The environment processor 480 may perform one or more automated testing environment validation processes during the registration phase. Various such processes may be executed to confirm, among other things: that the physical testing environment 450 is suitably lit and quiet; that the client device 406 is stationary and stabilized in a suitable orientation; that the network connection and data transfer between the platform 400 and the client device 406 is of sufficient quality; and, that the candidate user is present and exhibiting normal behavior. In some embodiments, the environment processor 480 may obtain sample data from input received from the candidate user's client device, including without limitation a video stream, an audio stream, form data, signals indicating keyboard or mouse activity, images, sensor data, and the like. In some embodiments, the environment processor 480 may compare the sample data to predetermined threshold values to determine whether the testing environment 450 satisfies a set of requirements. Depending on the type of data being sampled and other factors, the environment processor 480 may collect and compare some of the same data a single time in order to validate it, and the environment processor 480 may periodically collect and compare other sample data to secure or maintain a validation.

If environment processor 480 determines that physical testing environment 450 satisfies pre-determined requirements that indicate the environment is suitable for test taking, platform 400 may enable client device 406 to begin or continue evaluating a candidate using a candidate evaluation software application executed by or running on client device 406. Client device 406 may evaluate the candidate, for example, by using the candidate evaluation software application to display one or more test questions or problems, testing scenarios, or the like, and receiving input from the candidate using one or more user input devices connected to or otherwise interface into client device 406.

If, however, using one of the approaches described herein, environment processor 480 determines that physical testing environment 450 is not suitable for testing (i.e., because one or more criteria evaluated by environment processor 480 is not satisfied), platform 400 can take steps to prevent or otherwise inhibit evaluation of the candidate. Specifically, platform 400 can cause client device 406 (and, specifically, the candidate evaluation software application) to prevent client device 406 from evaluation of the candidate. In otherwise, platform 400 can prevent evaluation of the candidate from taking place or, if evaluation is already underway at the time environment 450 is determined to be unsuitable, platform 400 may terminate or halt the valuation.

Typically, environment processor 480 is configured to receive data from client device 406 that describes one or more attributes of the environment in which client device 406 is located. To gather such data, client device 406 may include one or more sensors, such as a video camera, a microphone or audio recorder, or an accelerometer configured to detect an orientation of client device 406 within that environment. In FIG. 4A, only one such sensor (i.e., camera 470) is depicted, though it should be understood that client device 406 may include a number of other sensors or data-gathering devices to collect data describing physical testing environment 450.

When evaluating physical testing environment 450 for suitability, platform 400 may be configured to receive data from the one or more sensors of client device 406 that describe the environment of client device 406. The data, once received can be analyzed to determine whether each data point falls within a set of constraints indicating suitability of physical testing environment 450.

For example, various environment validation processes involve analyzing image and/or video data captured by the client device's webcam or similar video capture peripheral and transmitted to the platform 400. In one or more such processes, the environment processor 480 may obtain one or more frames of the video feed, which may consist of a sequence of images, and compare these frames to stored thresholds or to each other to evaluate the testing environment 450. Such comparisons may, in some embodiments, include applying an image processing algorithm to one or more of the frames to extract, as the sample data, information about or attributes of the corresponding images that is representative of conditions in the testing environment 450. For example, the environment processor 480 may perform a luminance analysis of one or more of the frames to determine a light level in the testing environment 450; the environment processor 480 may invalidate the testing environment 450 if the light level is below a predetermined threshold for suitable lighting. The determination of a luminance or brightness level of one or more frames of a sequence of images in video data may be determined using well-established video processing and analysis technologies. In one embodiment, the luminance level may be determined by performing a luminance conversion of red, green, blue (RGB) values contained in the received video data.

In another example, the environment processor 480 may analyze one or more of the frames to identify straight lines in the images, which may represent walls, shelves, corners, and other objects and features that the environment processor 480 can use to determine orientation of the client device

406; the environment processor 480 may invalidate the testing environment 450 if too many of the straight lines are askew from horizontal or vertical, indicating the client device 406 is not properly oriented for testing. Additionally or alternatively, the environment processor 480 may compare the locations of the straight lines within multiple frames to determine whether the client device 406 is moving or stationary.

In another embodiment, the environment processor 480 may perform other image processing to characterize the connection and data flow with the candidate's client device 406. For example, the environment processor 480 may sample the contrast or contrast ratio of one or more frames to determine whether the image quality is sufficient, or may determine whether the frame rate of the video feed is high enough for testing purposes. The determination of a contrast or contrast ratio of one or more frames of a sequence of images in video data may be determined using well-established video processing and analysis technologies.

In another embodiment, the environment processor 480 may perform object identification or object tracking within one or more frames. For example, the environment processor 480 may identify the candidate user in the video feed (e.g., via facial recognition) and may further use object tracking to evaluate the candidate user's movements, including eye movements. Similarly, the environment processor 480 may determine whether people or other objects are present when they should not be.

Testing environment validation processes may involve other types of data as well. In some embodiments, the environment processor 480 may analyze the audio data from a microphone feed captured by a microphone in or connected to client device 406 to determine characteristics of the environment. For example, the platform may extract noise or volume levels from the audio data and invalidate the testing environment 450 if the noise levels are above a threshold for suitable ambient noise. In one embodiment, the environment processor 480 may extract noise information from the audio data and compare the noise information to known noise profiles to determine a type of noise. Random noise may be associated with a higher threshold than, for example, noise identifiable as speech. In an embodiment, environment processor 480 may determine a noise level with audio data received from client device 406 only in a particular range of frequencies, which may indicate a noise level of spoken words in the audio data. For example, in a given set of audio data, environment processor 480 may determine a noise level of audio signals that have frequencies common associated with spoken word (e.g., signals that do not have frequencies not commonly associated with spoken words, such as frequencies less than 50 Hertz and greater than 300 Hertz, though other frequencies ranges indicative of non-speech noise may be utilized). The noise level of those signals can then be compared to a threshold and, if the threshold is exceeded, environment processor 480 may determine that testing environment 450 is unsuitable for performing the evaluation. Specifically, this particular criteria (the evaluation of noise levels with frequencies commonly used for speech) can be useful to detect an environment in which too many individuals are talking (which may potentially lead to a risk of cheating), but would allow environment processor 480 to ignore or otherwise filter-out audio signals at frequencies unrelated to human speech and, therefore, unlikely to render the environment unsuitable. For example, using this approach, noises such as alarms, police sirens, air-conditioning system rumbles, and the like, may not invalidate the testing environment, whereas individuals talking in the testing environment could invalidate the environment.

Additionally or alternatively, the environment processor 480 may evaluate patterns in user input that may indicate unusual behavior or problems with the testing environment 450. For example, the environment processor 480 may periodically check for keyboard or mouse activity, such as by sampling keystroke and/or cursor movement input. In some embodiments, the activity itself may indicate issues with the testing environment 450. For example, abnormal mouse movements may indicate that the mouse is not on a stable surface. In other embodiments, lack of activity can be an invalidating factor, indicating unusual response time of the candidate user or other issues.

In some embodiments, if the testing environment 450 fails any of the validation processes, the environment processor 480 may instruct the platform 400 to refuse to execute the examination. This may involve the platform 400 instructing the candidate's computing device to inhibit or prevent the performance of a candidate evaluation function (i.e., the testing of a candidate) using a candidate evaluation software application executed by the candidate's computing device. Additionally or alternatively, the environment processor 480 may generate an alert record describing the process failure and may store the alert record in association with the candidate user's account data. In some embodiments, certain invalidating conditions can be indicated to the platform 400 as correctable. For example, in the validation process workflow, a negative but correctable result can be marked with a flag, and may further be associated with alert language describing the problem and one or more solutions. The environment processor 480 may detect the flag, obtain the alert language, and send an alert to the client device for display. The alert may include an interactive graphic, such as a button, that the candidate user clicks after correcting the condition, and the environment processor 480 may perform the validation process again.

In an embodiment, environment processor 480 may be implemented using a machine learning engine (MLE) (e.g., a neural network) trained to detect environments indicative of increased risk versus environments demonstrating relatively low risk. In such an embodiment the various types of environmental data described above could be captured during execution of a number of real-world testing instances. Each of those testing instances can then be manually analyzed to associate each real-world test with a risk score. That set of the data (the combination of real-world environment data with associated risk score) can then be utilized as a set of training data used to train an MLE to perform automated evaluation of testing environments to determine a risk score associated with the environment. Specifically, the MLE may be trained using the set of data by extracting particular features out of the set of data. An example feature set vector that may be extracted out of the training data may include a luminance value of at least one image from the sequence of images in the video data, a contrast ratio value of at least one image in the sequence of images in the video data, and an average noise level of the audio data (which may be constrained to a particular range of frequencies, as described herein).

As described, the above testing environment validation processes may be performed during the registration phase. Advantageously, this provides for an invalid testing environment 450 to be rejected or corrected before the greeting phase begins. In other embodiments, some or all of the validation processes described above may be executed after the registration phase is complete. Additional testing environment 450 validation processes may be performed during the greeting phase; these processes may perform additional validation of the candidate user and other parties authorized to be present, among other conditions. In the greeting phase, the platform 400 connects the candidate user to a "greeter," which may be an administrative user or a proctor user. In some embodiments, the greeter and his device 464 are authenticated by the platform 400 and a channel to carry the greeter's video and/or audio feed to the platform 400 is established. The platform 400 then transmits the candidate user's video and audio feeds to the greeter's device 464, and may transmit the greeter's video and/or audio feeds to the candidate user's client device 406. Another communication channel for transmitting typed information between the greeter's and candidate user's devices 464, 406 may also be established.

The greeter, viewing the candidate user's video feed, may provide spoken and/or typed instructions to the candidate user to facilitate testing environment validation processes. Part or all of these processes may be automated by the environment processor 480. In some embodiments, the candidate user may be required to show to the greeter, via the client video capture device, a driver's license or other identification card. To partially automate validation of the identification card, the environment processor 480 may extract a frame depicting the identification and compare a purported image of the candidate on the identification to existing images of the candidate to confirm the images depict the same person. Existing images of the candidate may be obtained from internal data stores 410, or from one or more external data sources 462 such as school, employer, or government databases or social media network services. The comparison may produce a match, or may identify discrepancies between the presented identification and stored data; the environment processor 480 may report any result to the greeter for further action.

In another embodiment, the candidate user may be instructed to pick up the client device 406 or a connected video capture peripheral and slowly capture images of the entire testing environment 450 (i.e., by rotating the video camera in a complete circle). Typically, the greeter observes the testing environment 450 during this process, to confirm that no unauthorized persons or devices are present and the testing environment 450 is otherwise suitable for testing. The environment processor 480 may compare the video stream, or frames selected therefrom, against a stored (e.g., in one of the internal data stores 410) dataset of known-valid and known-invalid testing environments, and may produce a determination as to whether or not the testing environment 450 is valid. In some embodiments, the dataset of testing environments may be sampled from actual testing environments, include those that are known to have involved cheating or intellectual property theft.

The environment processor 480 may perform object identification and tracking within selected frames of the video feed, as described above, to identify other persons present in the testing environment 450. In some embodiments, the environment processor 480 may apply a restriction that no other people can be present in the testing environment 450 during testing; thus, the environment processor 480 only needs to determine that a person other than the candidate user is present in the video frames to invalidate the testing environment 450. In other embodiments, parameters associated with the user account and/or the exam that the candidate user is registered to take may indicate that other parties are authorized to be present.

For example, the candidate user account may indicate that the candidate is disabled; the environment processor 480 may read such an indicator and relax the restriction to allow for a predetermined number of assistants to the candidate to be present in the testing environment 450. In some embodiments, the platform 400 may require the assistants to complete an identification and/or registration process as described above, and the environment processor 480 may verify the assistants' identities as well. In some embodiments, a trust score may be determined for the assistants themselves to determine any risk of cheating or intellectual property theft that may be associated with the assistants.

In some embodiments, the platform 400 may include a machine learning engine implemented on any of the servers 402, 412 and executing one or more machine learning algorithms to evaluate the data pertaining to a testing environment validation process. The machine learning engine may be trained on one or more datasets identifying valid and/or invalid conditions of a testing environment in order to quickly determine from the client device 406 input data whether such conditions are present in the candidate user's testing environment 450. The training dataset may include some or all of the threshold and modeling information described above, such as video recordings of real or artificial testing environments, lighting and noise level thresholds, device positioning constraints, and the like. The machine learning engine may report results of its analysis to the environment processor 480, or to the greeter or another party, and may receive feedback confirming or denying the results; the machine learning engine may incorporate the feedback into its algorithms to refine the validation processes. In some embodiments, the environment processor 480 may send input data, such as video feeds, to a back-end server 412 configured to perform the above-described data analysis and report the results to the environment processor 480.

The testing environment validation processes, and other processes described herein that perform video monitoring of the candidate user or the testing environment 450, may operate on a single video feed in some embodiments. In some embodiments, this video feed may be generated by a webcam of the client device 406, or by a video recording peripheral connected to the client device, as described above. These recording devices may be augmented with optical hardware that improves the content of the video feed for monitoring. For example, one or more mirrors or lenses, such as a fisheye lens, may be attached to the video recording device or positioned within the testing environment 450 to provide additional views of the testing environment 450. In other embodiments, the single video feed or additional video feeds may be generated by one or more video capture devices 470 that are not attached to the client device. For example, the candidate user may own or obtain a smartphone, smart TV, internet-enabled video camera (e.g., a 360-degree camera), or another such device, and can place the device in the testing environment 450. One or more secondary video capture devices 470 may be connected to and registered with the platform 400, such as through the registration procedure described above. These secondary video capture devices 470 may then be configured to capture a video stream and send it to the platform 400, and the environment processor 480 may incorporate the secondary video stream into the various video monitoring processes.

Figure 5:
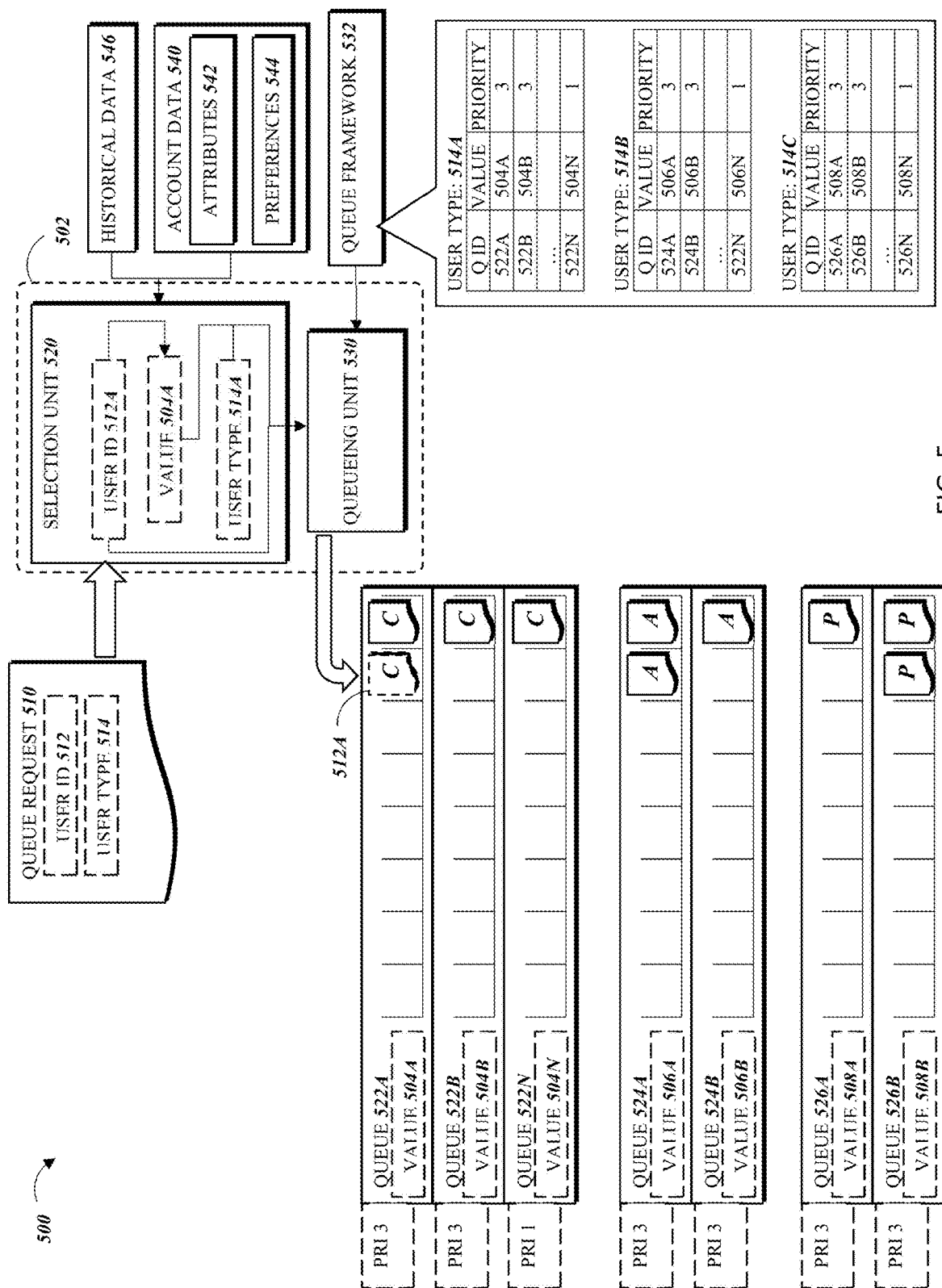
FIG. 5 is a system level block diagram of another example embodiment of an online proctored examination platform that includes a queuing service in accordance with the present disclosure.

With reference to FIG. 5, an online proctoring platform 500 in accordance with the present disclosure may include server computer computing hardware and/or software that implements a queueing service 502 for ensuring that the most compatible available greeters and/or proctors or other administrative users are allocated to candidate users during the registration and/or greeting phases of the examination process. Greeters, which may themselves be proctor users or may be administrative users, and proctors are more or less "compatible" with a candidate depending on whether they possess various attributes that match those of the candidate or of the candidate's preset preferences. Additionally, historical data relating to the greeter's and/or candidate's usage of the platform 500 may be a factor in measuring compatibility. The queueing service 502 may be based on one or more of the target attributes, as described below. Examples of the desired outcome of the queueing service 502 operations include: allocating a greeter, proctor, or other administrative user who speaks the native language of the candidate; allocating a greeter, proctor, or other administrative user of a certain gender to satisfy the religious obligations of the candidate; matching a candidate with a special need to a greeter, proctor, or other administrative user with training in meeting the special need; and, maintaining efficient allocations of greeters/proctors/administrators during times of unusual platform traffic or activity.

The queueing service 502 may be implemented on any suitable computing hardware of the platform 500, such as front-end or back-end servers described above with respect to FIGS. 1A-B, 3, and 4A-B. In some embodiments, the queueing service 502 may include a selection unit 520 and a queueing unit 530. The selection unit 520 may receive queue requests 510, which are generated by user activity as described below, and represent a user who is ready to participate in the examination process. Typically, queue requests may be received by queueing service 502 as an electronic transmission from a candidate device (e.g., a mobile device, laptop or desktop computer, or the like) that encodes certain information about the candidate, such as an identifier that may be utilized to uniquely identify the candidate. Specifically, the queue request 510 may include a user identifier 512, an indicator 514 of the user type (i.e., candidate, administrative, proctor), and other data. The selection unit 520 uses the information in the queue request 510 to identify the user and determine the user or candidate attributes that correspond to one of the queues, as described further below. The selection unit 520 may pass this information to the queueing unit 530, which identifies the corresponding queue and places a reference to the user in the queue as described below. The queueing unit 530 may also remove users from the queues as described below.

Values of various attributes 542, including candidate target attributes used to determine compatibility, may be stored in, or associated with, the user account data 540 of the corresponding user; a user may enter the values of the attributes during user account creation, or as part of an updating function for the user account data 540. In some embodiments, the platform 500 may enable (e.g., by providing a graphical user interface that collects user input to) a candidate user, a proctor user, and/or an administrative user to enter compatibility preferences 544 (i.e., target attributes) that include preferred values for some or all of the target attributes of a matching (i.e., compatible) user; for example, a candidate user may enter, as compatibility preferences 544, his preferred values for the target attributes of a greeter or proctor. Non-limiting examples of target attributes of any of the user types include specific data values: age; gender; location; religious affiliation; primary or preferred language; disability data (e.g., indicators that the candidate has one or more particular disabilities); and, trust score. Another example target attribute for candidate users is current medical conditions (e.g., nursing mother; vertigo; migraines; other conditions that affect test-taking ability). Another example target attribute for administrative or proctor users is specific training (e.g., sign language or other hearing impaired training).

The queueing service 502 may evaluate historical data 546 to further refine the queue selection. Such historical data 546 may include alert records associated with a user of any user type, which indicate past complaints, disputes, or other issues between a candidate and a greeter/proctor that are material to compatibility. Other historical data 546 that may be used includes usage data describing a candidate user's historical usage of the system. For example, historical data may indicate that a candidate user that has taken zero or very few exams on the platform 500 may be associated with an attribute of a novice or inexperienced candidate user. By associating the user with such an attribute, the user can be matched with a greeter or proctor selected from a queue of greeters or proctors designated and associated with novice or inexperienced candidates. As such, the novice candidate user can be allocated a greeter or proctor experienced in dealing with novice candidates. In another example, the historical data 546 may reflect that the candidate user has created security concerns in the past, and should have multiple experienced greeters and/or proctors assigned to him.

In various embodiments, the queueing service 502 may maintain a queue framework 532 describing queues for one or more of the types of users: candidate users 514A, administrative users 514B, and administrative users 514C. The illustrated example queueing service 502 manages one or more queues for each of the user types. The queue framework 532 may be a lookup table stored in memory, a database, a data structure, or another suitable set of data elements that the queueing service 502 is configured to access in order to identify the proper queue for a queue request 510. A queue may be a 1- to N-dimensional array of elements implemented in a suitable computer memory, such as volatile or non-volatile system memory or disk storage of any computing device in the platform, such as the servers or back-end servers described above. To queue a user, the queueing service 502 may store a reference, pointer, or other identifier of the user as an element in the appropriate queue. In one embodiment, each queue is serviced by the queueing service 502 in first-in-first-out fashion, where the oldest element is at the front of the queue. In another embodiment, some or all of the queues may be non-prioritized, and the queueing service 502 may execute one or more comparisons of user data to determine and extract the "most compatible" user for matching. To remove a queued user, the queueing service 502 may remove the corresponding identifier from the queue and then update the queue, such as by moving all queued users one element toward the front.

Within each user type, each queue may be associated with one or more values of a target attribute or a combination of target attributes. For example, a first candidate queue 522A may be associated with a first value or attribute 504A, such as the value "Female" for the attribute "Gender," and a second candidate queue 522B may be associated with a second value or attribute 504B, such as the value "Male" for the attribute "Gender." Greeter queues 524A,B and proctor queues 526A,B may similarly be associated with unique values or attributes 506A,B, 508A,B, respectively. For attributes that have a much larger range of values, such as age and location, a queue may be associated with a subset of those values: candidate queues may be associated with an age attribute, for example, that may be divided into, for example, ages 15-18, 19-22, 23-30, 30-40, and 40+; proctor queues for location may be differentiated by geographic coverage, such as states, regions, countries, and the like. In some embodiments, to achieve finer compatibility comparisons some queues may be associated with values of multiple attributes. For example, some proctor queues may be associated with various combinations of values for "gender" and "primary language": "male and Persian;" "female and Persian;" "male and German;" "female and German;" and so on.

The queueing service 502 may further manage one or more priority queues based on certain attributes or data. For example, greeter and proctor queues may include queues for certain special needs where it is imperative that a candidate with the associated special need receive a greeter and one or more proctors that are trained to accommodate that special need. In another example, candidate queues may include one or more escalation queues 522N associated with historical data elements, or testing environment validation data elements, that indicate high-risk behavior of the candidate; regardless of a candidate matching with other queues, if he matches an escalation queue 522N the queueing service 502 will queue him there.

As described, the queueing service 502 may query one or more internal data stores containing stored values for the target attributes in order to queue users in accordance with this disclosure. In one example process flow, when a candidate user logs into the platform 500 with his user ID 512A and initiates the examination process, the queueing service 502 receives the queueing request 510 from the platform 500. The selection unit 520 may determine that the user ID 512 in the queue request 510 is a particular user ID 512A identifying the candidate user. In some embodiments, the selection unit 520 may first use the user identifier 512A to obtain historical data 546 (e.g., alert records, testing data, behavioral data) of the candidate user, and determine whether any such data indicates that the candidate user should be queued in an escalation queue 522N or another special queue. If so, the selection unit 520 may notify the queueing unit 530 to queue the candidate user accordingly. If not, the selection unit 530 may use the user identifier 512A to search attributes 542 and preferences 544 in the user's account data 540 to obtain the candidate user's target attribute values.

For example, this may involve selection unit 520 determining a trust score for the candidate associated with the queue request 510. The trust score is, generally, an indicator of risk associated with the candidate, where the risk may describe the likelihood of the candidate cheating during an evaluation activity or misappropriating intellectual property, such as by re-distributing content accessed during the evaluation activity. If the trust score falls below a predetermined threshold (indicating that the risk of inappropriate behavior is too high), the candidate may automatically, and without further input, be allocated to an escalation queue regardless of that candidate's particular target attributes. With the candidate allocated to the escalation queue, the candidate will, ultimately, be allocated greeters and proctors that are similarly associated with escalation queues and are suited to managing the risk associated with such a candidate.

Conversely, if the candidate's trust score exceeds the threshold (indicating that the risk associated with the candidate is relatively low), the candidate user can be allocated to a queue based upon that candidate's target attributes.

The selection unit 530 may obtain values for multiple target attributes, and may need to prioritize them in order to select an associated queue if there is no single queue whose attributes match each of the multiple target attributes. In some embodiments, the selection unit 530 may determine preferences or prioritization (i.e., weighting) of the various attribute values based on compatibility preferences 544 and other data stored in or associated with the user account (or, the weighting of attributes may be uniform for all users of a given type). From the weighting, the selection unit 520 may rank attributes or combinations of attributes according to their importance for greeter/proctor compatibility. The selection unit 520 determines from this ranking which value 504A (or combination of values) to use to identify a queue. This may involve, for example, determining that one of the candidate's attributes is a primary candidate target attribute. The candidate could then be assigned a queue by matching the primary candidate target attribute to a queue having the same attribute, with all of the candidate's other attributes being designated as optional and not being required to be matched by the candidate's assigned queue. The selection unit 520 may pass the user ID 512A, the user type 514A, and the identified value 504A to the queueing unit 530.

The queueing unit 530 then finds the closest-matching candidate queue to the candidate's highest-ranked value(s). In one embodiment, the queue framework 532 may associate queue identifiers with corresponding attribute values for the queues of each user type 514A-C; the queueing unit 530 may query the queue framework using the user type 514A and then the value 504A to determine the corresponding queue 522A. The queueing unit 530 then attempts to insert an identifier for the candidate user (e.g., the user identifier 512A) into the candidate queue 522A. In some embodiments, the queues may have a maximum length, and the queueing unit 530 may determine that the identified queue 522A is full and select another queue. This continues until the candidate user is queued in the best available queue. In some embodiments, the queues may be associated with attributes that include a range of values. For example, queues may be associated with age ranges or geographical regions. In that case, a candidate user, for example, may be associated with a candidate queue by identifying a queue that is associated with a range of attributes that includes one or more target attributes for the candidate. For example, if the candidate is 20 years of age, the candidate would be matched with a queue that is associated with the age range of 19 to 26 years of age. Similarly, if the candidate has an attribute for the candidate's location (e.g., Barcelona, Spain), the candidate could be matched with a queue associated with a geographic region attribute (e.g., Europe) that includes the candidate's location attribute.

Proctor users and administrative users may be queued in a substantially similar manner to candidate users. In some embodiments, when a proctor/administrative user logs into the platform, he may be queued as described above. Alternatively, the platform may enable proctor/administrative users to "mark" themselves as available or unavailable, and the request for the queueing service 502 to queue a proctor user or administrative user may be generated when the user's status changes to "available." In some embodiments, the queueing process may dynamically respond to platform and/or external conditions, expanding or contracting queues and/or modifying attribute weights to accommodate changes in traffic. For example, during unusual levels of activity (e.g., very busy or very slow times), the queueing system 502 may either: adjust the weightings to achieve a target number of greeters/proctors per queue; or, increase or decrease the number of queues to keep a target number of candidates in each queue. In another example, the queueing service 502 may respond in real time to current events and/or emerging cultural issues by adjusting the attribute weights accordingly.

As the illustrated example is explained above, the candidate queues 522A . . . N contain identifiers for candidate users who are prepared to take an exam, the greeter queues 524A . . . N contain identifiers for administrative users who are available to serve as greeters, and the proctor queues 526A . . . N contain identifiers for proctor users who are available to proctor candidate users' examinations. The queueing service 502 may match candidates to compatible greeters and proctors using matching logic that is based at least in part on the attributes associated with the queues. For example, the candidate queue 522A may be associated with French-speaking candidates, the greeter queue 524A may be associated with French-speaking greeters, and the proctor queue 526A may be associated with French-speaking proctors. The queueing service 502 may be configured to: check the contents of candidate queue 522A and remove a first candidate from the front of the candidate queue 522A; determine that the candidate queue 522A is associated with the value "French" of the attribute "Language;" determine that the greeter queue 524A is associated with the value "French" of the attribute "Language;" remove a first administrative user from the front of the greeter queue 524A; notify the platform that the first candidate user's examination process is ready to begin the greeting phase by establishing a connection between the first candidate user's client device and the first administrative user's device, as described above; determine that the proctor queue 526A is associated with the value "French" of the attribute "Language;" remove a first proctor user from the front of the proctor queue 526A; and, notify the platform that the first proctor user is ready to be allocated to the first candidate user when the examination phase begins. Matching between queues associated with other target attributes or combinations of target attributes may proceed in similar manner. Additionally, matching may be between preferences or settings of a user account, and a corresponding queue. For example, a candidate user may specify that no high-risk proctors are to be assigned to the candidate user's examinations; proctor queues may be associated with corresponding ranges of the proctor's trust score, including a first range associated with high-risk behavior and corresponding to a first proctor queue, from which the system will not select proctors for the candidate user's examinations.

In another example, at least some of the candidate queues 522A,B may be associated with a range of values for candidate trust scores. In particular, a first candidate queue 522A may be associated with trust scores above a threshold indicating low-risk behavior, and a second candidate queue 522B may be associated with trust scores below a threshold or within a range indicating high-risk behavior. The queueing service 502 may prioritize high trust scores through the weighting algorithm, and may check the first candidate queue 522A for available candidate users before any other candidate queue. Additionally, the platform 500 may streamline the greeting phase and other processes for candidate users pulled from the first candidate queue 522A, due to their high trust scores as described above. In contrast, the queueing service 502, upon pulling a candidate user from the second candidate queue 522B, may match the candidate user to a specially trained or experienced proctor, or to multiple proctors in accordance with the high-risk security procedures employed by the platform 500, including any of those described herein.

Figure 6A:
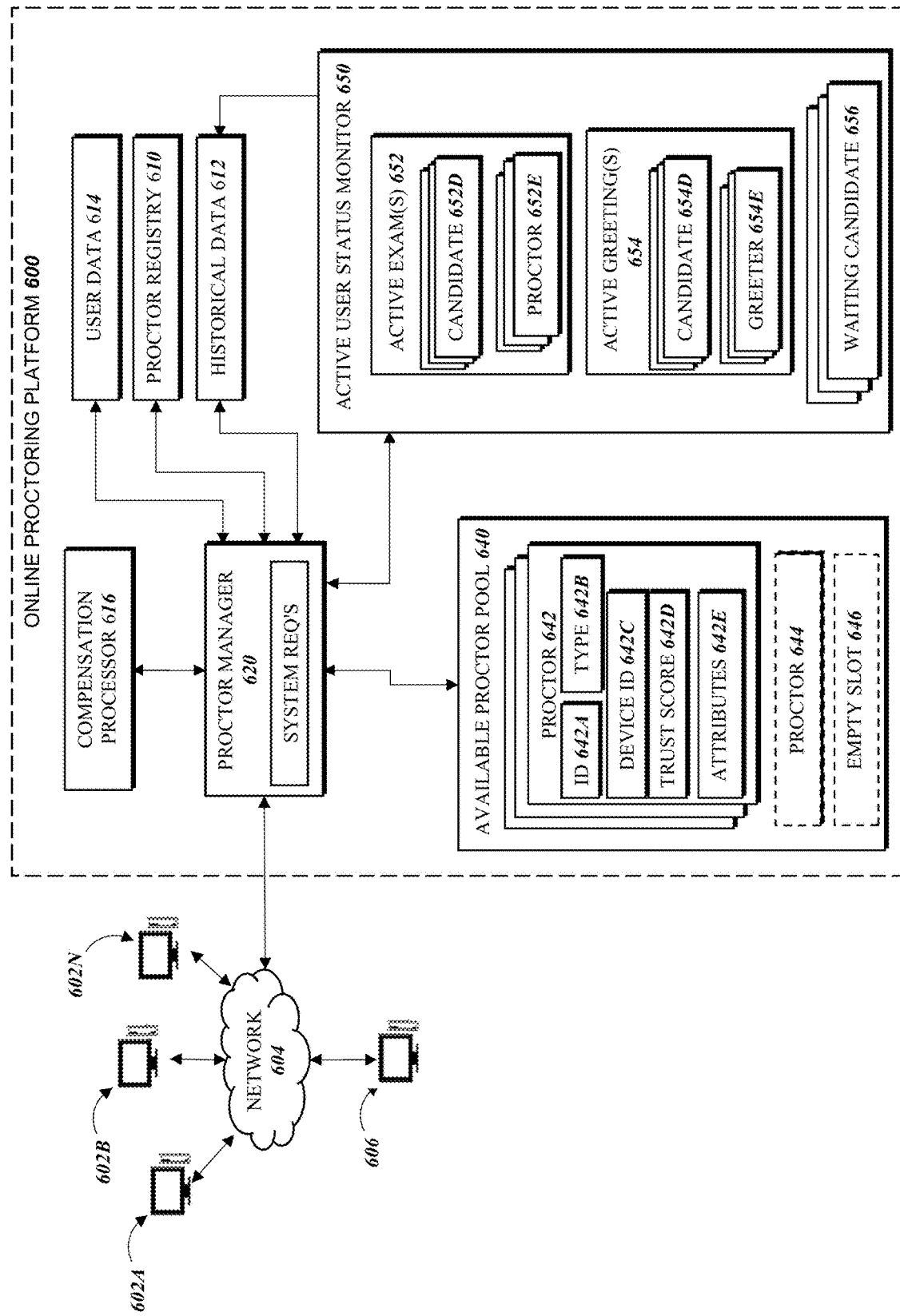
FIGS. 6A and 6B are system level block diagrams of another example embodiment of an online proctored examination platform that requests and allocates on-demand proctoring resources in accordance with the present disclosure.
Figure 6B:
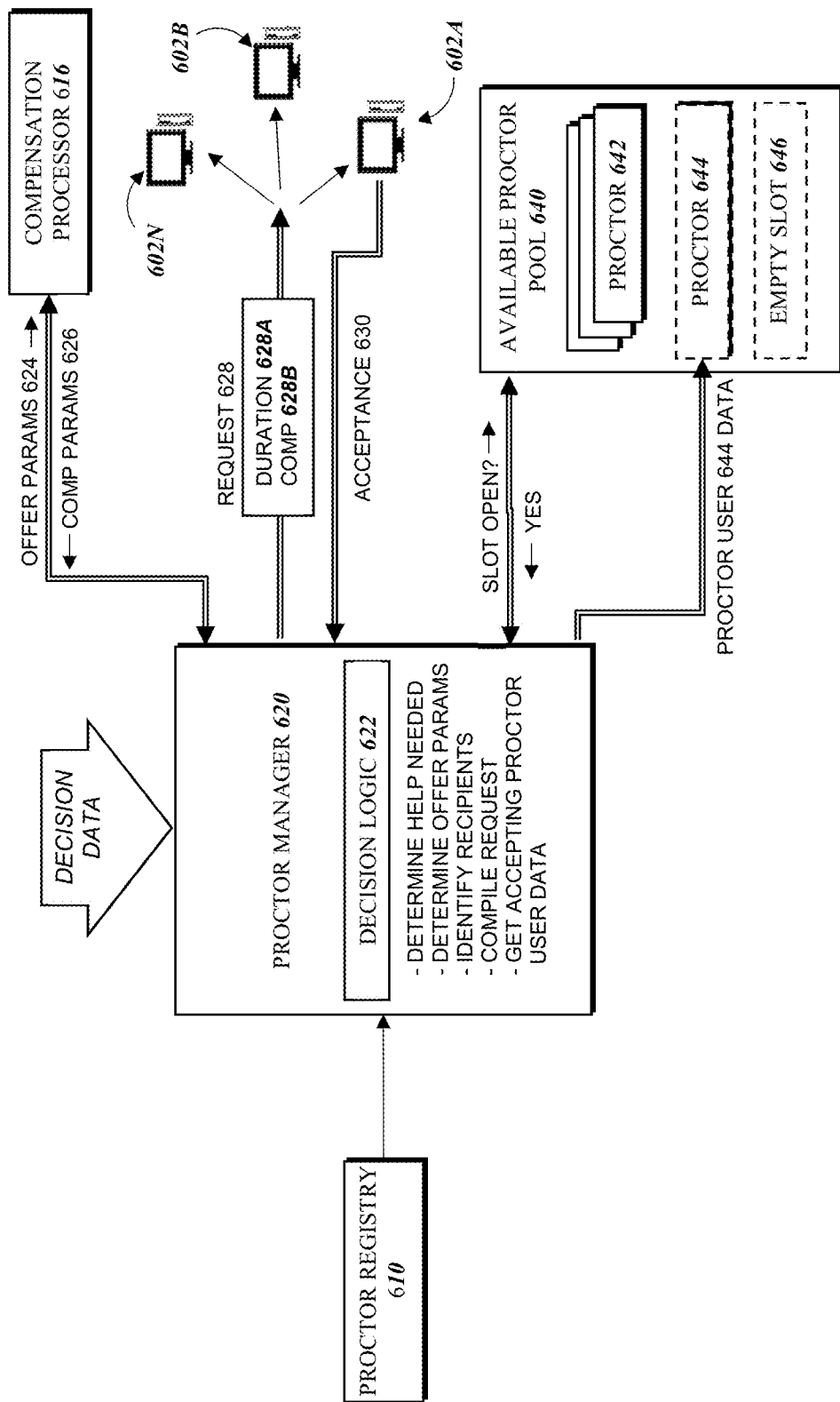

Referring to FIGS. 6A-B, in addition or as an alternative to a dynamically scalable queueing system as described above, an online proctoring platform 600 in accordance with the present disclosure may implement a pool 640 of available proctors. To manage fluctuations in usage, the platform 600 may fill the pool 640 by communicating with registered on-demand proctor users and inviting them to access the platform 600 and join the pool 640. The platform 600 may be implemented in a distributed computing environment as described above; components of the platform 600 described with respect to FIGS. 6A-B may be implemented on any computing hardware and/or software of the platform 600, such as front-end and back-end servers and data stores as described above. The platform 600 may communicate with client devices via a communication network 604. Some client devices may be associated with users having registered user accounts on the platform, such as client devices 602A,B, . . . , N associated with proctor users, and client device 606 associated with a candidate user. It is contemplated that the dynamic allocation of proctors via an active proctor pool, as described with respect to the example embodiment of FIGS. 6A-B, may be modified within the system to provide the same dynamic allocation functionality for greeters, which may be proctor users or administrative users.

On-demand proctors that may be requested to join the pool 640 may include many different types of proctors having different levels of experience and/or qualifications. Non-limiting examples of different proctor types, which may be tracked and used by the platform 600 as described below, include: typical proctor users of the platform 600, having varying experience and attributes; purpose-trained online proctoring proctors; proctors with other special training relevant to proctoring; proctors with special training in particular fields (e.g., nursing, driving, finance); independent contractors that have passed background checks and completed predetermined training activities; administrative users of the platform 600; and, artificial intelligence (AI) proctors (e.g., trained by machine learning).

Referring to FIG. 6A, the platform 600 may include a proctor registry 610, which may be a database, lookup table, or another data storage structure or internal (to the platform) data store that stores some or all of the user data for proctor users registered with the system. For example, a registry entry for a proctor user 642 may include an identifier 642A, a device identifier 642C for the proctor user's registered device, a "type" 642B (e.g., trained, specially trained, independent contractor, greeter, etc.), and one or more attributes 642E used to generate demographic data of the active proctor users (as described below) and to determine whether the proctor should be asked to join the pool 640 in various circumstances. In some embodiments, the attributes 642E may include some or all of the target attributes described above for use in the queueing system, or other target attributes. A proctor user's registry entry may further include, as one of the attributes, the proctor user's trust score 642D, if available. In some embodiments, on-demand proctor users may be differentiated in the registry 610 from "regular" proctor users; the on-demand designation may be added to registry entries of proctor users that have agreed to receive requests to become available on the platform when the additional proctor resources are needed; the on-demand designation may further ensure that the on-demand proctor user is only requested to become available (i.e., to join the pool 640, as described below) if his services are needed. In other embodiments, the proctor registry 610 may store information for only on-demand proctors; information for proctor users who have not been designated "on-demand" may be stored in a separate registry.

The platform 600 may include a proctor manager 620, which is a computational service that communicates with eligible proctor users, manages the size and composition of the available proctor pool 640, and allocates proctor resources to the available proctor pool 640 and to pending examinations (via queues, if any). The proctor manager 620 operations may be guided at least in part by one or more system requirements stored or accessible by the manager 620. The system requirements may specify thresholds, ratios, ranges, and other parameters having associated values for maintaining the proctoring resources of the platform at predefined levels and determining the need, or lack thereof, for proctor users to join the pool 640 to increase proctoring resource availability in response to a violation of the system requirements. Such requirements may apply at various levels, from system-wide to being narrowly focused on particular groups of candidates or types of proctors, or even individual users. Non-limiting examples of system requirements include: a minimum ratio of active proctors-to-candidates that the platform 600 must maintain at all times; a minimum ratio of required proctors for candidate users with particular attributes, such as a low trust score; a minimum number of proctors having a trust score above a certain threshold, or levels of minimum proctors based on the proctors' trust scores; a minimum number of proctors having certain attributes or certain special training, such as special needs training; and the like. In another example, the manager 620 may be required to recruit proctors having attributes that match those of candidates that are taking a particular exam or are part of a large or growing group of candidates. In yet another example, system requirements may be associated with instructions that the manager 620 follows to take corrective action when the requirement is not met. For example, some system requirements (e.g., threshold minimums) may be "absolute," where the manager 620 is instructed to suspend testing if the requirement is violated; other requirements may be "soft," where the requirement sets a period of time that the available proctoring resources can violate the requirement (e.g., a parameter's measured value is below the minimum) before corrective action is pursued. Still other system requirements can be "preferred," wherein the manager 620 is instructed to allocate AI proctors to meet the minimum for a predetermined maximum time period.

While honoring the system requirements, the proctor manager 620 may also monitor the activity of users on the platform 600, and make proctor allocation decisions based at least in part on current platform usage data. In some embodiments, the platform 600 may include an active user status monitor 650, which may be a service that continuously checks the status of all users logged into the platform 600. In one embodiment, the monitor 650 may be configured to respond to status queries, such as from the proctor manager 620. The monitor 650 may track the status of active examinations 652—that is, examination processes that the platform 600 is executing, and that have reached the examination phase. Active examinations 652, as monitored by the monitor 650, may include identifying information for the candidate user(s) 652D taking the associated exam, and for the proctor user(s) 652E allocated to the candidate user(s) 652D for proctoring their exam. The monitor 650 may also track the status of active greetings 654—that is, examination processes that the platform 600 is executing, and that have reached the greeting phase. Active greetings 654, as monitored by the monitor 650, may include identifying information for the candidate user(s) 654D and greeters 654E (i.e., administrative or proctor users) engaged in the associated greeting, and may also include proctor user information, if any have been allocated to the candidate user(s) 654D. Additionally, the monitor 650 may track waiting candidate users 656 who have logged onto the platform 600 and are registered to take an exam, but have not yet reached the greeting phase of their examination process.

Altogether, the monitor 650 may keep count of the active users, in total and/or separated by user type, currently engaged in the examination process. The monitor 650 may be enabled to report this and other tracked information to the proctor manager 620, either in response to a request from the proctor manager 620 or automatically on a regular basis. In some embodiments, the proctor manager 620 may also obtain identifiers for the active users from the monitor 650, and may use the identifiers to obtain additional information about the users from internal data stores containing user data 614. The proctor manager 620 or another platform service may, in various embodiments, maintain demographic data describing usage conditions of the platform, as defined by compositions of the current users of the platform. The demographic data may be maintained by obtaining and aggregating values for one or more attributes associated with some or all of the candidate users and/or some or all of the proctor users. The proctor manager 620 may evaluate the demographic data to identify the current platform 600 usage conditions that can be addressed via allocation or reallocation of proctor users and/or recruitment of on-demand proctor users in order to change the composition of available proctoring resources, or more specifically the composition of available proctor users that are actively using (i.e., logged into and/or waiting to be allocated to an examination process or to a candidate user) the platform and have not been allocated to a candidate user, to match a target composition of the proctoring resources or to otherwise satisfy a current or upcoming (as indicated by trends and other historical data relevant to the current time period) demand for proctoring resources. For example, the demographic data may indicate that a large number of candidate users identify "French" as their primary language, and the number of available "French" speaking proctor users is disproportionately low. In another example, the demographic data may indicate that a large number or percentage of available proctor users (e.g., proctor users 642 in the proctor pool 640) are untrained or have low trust scores.

The proctor manager 620 may additionally or alternatively retrieve historical data 612 of the platform 600 and incorporate such data into its allocation decisions to make proctor resource allocations more proactive. For example, the historical data 612 may include traffic trends over various time periods; the proctor manager 620 may identify a substantially consistent increase or decrease in traffic repeatedly at a particular time of day, week, or month. In another example, the proctor manager 620 may identify from the historical data 612 an annual examination that has an unusually large number of candidates every year.

The proctor manager 620 may use the data (e.g., current usage data, current user data, demographic data, historical data, etc.) collected as described above to manage the size of the proctor pool 640 and the timing and parameters of requests that the product manager 620 sends to on-demand proctor users to recruit the proctor users to the available proctor pool 640. Non-limiting examples of this management include: sending "all hands" requests to most or all on-demand proctor users in response to available proctor resources falling below a system-required minimum; in anticipation of an upcoming demand for proctoring resources, such as an increase in candidate user traffic (e.g., indicated by historical trends), increasing the number of slots in the proctor pool 640 and then sending requests to fill the empty slots 646; decreasing the proctor pool 640 size to eliminate empty slots 646 when traffic is low; and, identifying on-demand proctor users that are most compatible with the current waiting candidate users 656 and sending requests only to those identified users. For example, the proctor manager 620 may determine, based on the usage conditions, that the need is to add, from the plurality of proctor users as the additional proctoring resources, a certain number of trained proctor users, the corresponding proctor user data of the trained proctor users indicating that the trained proctor users are trained to proctor examinations for candidate users having trust scores representing a risk of cheating or theft posed to the platform by the candidate users that is above a predefined threshold. In another example, the proctor manager 620 may determine, based on the usage conditions, that the need is to add, from the plurality of proctor users as the additional proctoring resources, a plurality of compatible proctor users each associated with proctor user data indicating that a first target attribute of the corresponding compatible proctor user matches a first attribute preference of a candidate user that is using the platform and is waiting to begin one of the examinations. In some embodiments, the proctor pool may be represented in memory by a data structure, lookup table, database, or other collection of data elements, each data element representing one of the slots and configured to store a corresponding entry for an available proctor user. In some embodiments, the proctor manager 620 may apply one or more ranking algorithms to proctor users 642 in the proctor pool 640 in order to prioritize the proctor users 642 for allocation to one or more of the waiting candidate users 656. Suitable ranking algorithms are described above with respect to the systems and methods for queueing users. When the platform 600 requires an available proctor user 642 to be allocated to a candidate user, such as when a waiting candidate user 656 enters the examination process and completes the greeting phase, the platform 600 may generate a request and deliver it to the proctor manager 620, and the proctor manager 620 may remove the highest ranking proctor user 642 from the proctor pool 640 and allocate it to the candidate user as required.

Upon a determination that on-demand proctor users are needed, the proctor manager 620 may send requests for proctor services to one, some, or all of the on-demand proctor users via corresponding client devices 602A-N of the on-demand proctor users. In some embodiments, the client devices 602A-N may be registered with the platform 600 (e.g., by having a phone number or other contact information, or a MAC address or other hardware identifier, stored as the device identifier 642C in the proctor registry 610). In some embodiments, some or all of the client devices 602A-N may further be a device that the corresponding proctor user uses to access the platform 600 and perform proctor services. A request may include information describing the proctoring offer, such as an expected duration of the engagement and an amount of compensation. The platform 600 may include a compensation processor 616 that calculates the compensation offer for a particular engagement and proctor. A proctor user 644 who receives the request may accept the proctoring offer using the corresponding client device 602A-N; in some embodiments, the offer is displayed in a graphical user interface that enables the proctor user to select whether or not to accept the offer. The proctor manager 620 receives the acceptance and places the proctor user 644 in the protocol pool 640. These processes are described further below with respect to FIG. 6B.

FIG. 6B illustrates an example process whereby the proctor manager 620 formulates a request for proctor services, sends the request to one or more recipient devices, receives at least one acceptance of the request, and allocates the accepting proctor user to the proctor pool 640. Decision logic 622 of the proctor manager 620 may comprise specific computer program instructions that, when executed, cause the proctor manager 620 to perform the example process. The proctor manager 620 may receive "decision data" comprising any of the platform metrics described above with respect to FIG. 6A (e.g., system requirements, current user counts, current user demographic data, historical data, etc.). The proctor manager 620 may process the decision data to determine that additional proctor resources need to be made available on the platform.

The proctor manager 620 may further determine, based on a measurement of proctoring resources available on the platform and other decision data, one or more offer parameters 624 that characterize the kind of proctoring assistance needed. For example, the offer parameters and/or their corresponding values may quantify or identify the additional proctoring resources, or more specifically the on-demand proctor users, that will satisfy a current or upcoming demand for proctoring resources or otherwise address the current usage conditions of the platform. Non-limiting examples of offer parameters 624 include: number of proctors needed; expected duration (e.g., length of time that a historical repetitive spike in traffic lasts); type of proctors needed; special training of proctors needed; minimum or maximum trust score of requested proctors; experience, such as number of online examinations proctored, or length of time proctor user has been a registered user; frequency at which responsive proctor users respond to requests; and the like. The proctor manager 620 may send some or all of the offer parameters 624 to the compensation processor 616. The compensation processor 616 may also be configured with decision logic that the compensation processor 616 executes to evaluate the offer parameters 624 and produce one or more compensation parameters 626. The compensation processor 616 may additionally or alternatively be configured to evaluate one or more attributes of specific on-demand proctor users in order to produce the compensation parameters 626. In some embodiments, the proctor manager 620 may identify the on-demand proctor users that will receive requests for services, obtain values for target attributes from the proctor registry 610 or from user data associated with the on-demand proctor users' accounts, and send the values to the compensation processor 616. In another embodiment, the compensation processor 616 may be configured to receive identifying information for the on-demand proctor users, or to identify the on-demand proctor users, and then obtain the target attribute values itself. The compensation parameters 626 may include, at least, one or more proposed monetary amounts to provide to proctor users who accept the request for services, activate their devices 602A-N on the platform, and successfully complete the requested proctoring services. The compensation parameters 626 may further include a description of the requested proctoring services, which the compensation processor 616 may produce based on the offer parameters 624 received, or which may be received by the compensation processor 616 (e.g., from the proctor manager 620). In some embodiments, the requested proctoring services may simply be a duration that an accepting proctor user is expected to be logged in and active on the platform in order to satisfy the request and receive the compensation. In another example, the requested proctoring services may additionally or alternatively include a number of examinations the accepting proctor user must proctor. The compensation amounts may be based at least in part on any of several factors measured in the offer parameters 624, such as urgency of need, duration of service, number of proctor users needed, type of service to provide, amount of proctor user experience required, and special training required. The compensation amounts may additionally or alternatively be based, at least in part, on one or more attributes of a specific on-demand proctor user that will receive the request, such as amount of proctoring experience, trainings completed, length of time the proctor user has been registered on the platform, prevalence and/or availability of other on-demand proctor users having the same or comparable qualifications, and proctor user "reliability" metrics measuring past performance on on-demand proctoring service situations.

The proctor manager 620 may then identify the recipients of the request for services. The recipients may be proctor users registered in the proctor registry 610 who meet the requirements of the service request. In some embodiments, such requirements may pertain to user account and historical data of a recipient proctor user: a threshold trust score and/or amount of experience, special training in a necessary area, etc. The proctor manager 620 may compile the request 628, such as by creating an electronic message containing some or all of the offer parameters 624 and/or compensation parameters 626, including at least the duration 628A and/or description of the requested proctoring services, and the compensation 628B of the job, and may send the request to the client devices 602A-N of the identified recipients. In some embodiments, the client devices 602A-N may have software, such as a mobile application on a smartphone, installed and executing; if the software is executing, the device 602A-N can be contacted by the proctor manager 620. The software may receive the request 628 and display the offer information in a graphical user interface (GUI) on the device 602A-N. The GUI may include an interactive graphic, such as a button, that the proctor user actuates to accept the request 628. The client device 602A of the accepting proctor user 644 may generate an acceptance message 630 and send it back to the proctor manager 620.

Upon receipt of the acceptance message 630, the proctor manager 620 may query the proctor pool 640 to confirm an empty slot remains. The proctor manager 620 may then identify the accepting proctor user 644 and access the proctor registry 610 or another internal data store to obtain user data for the proctor user 644 that is needed to create an entry for the proctor user 644 in the proctor pool 640. The proctor manager 620 may use the data to create the entry and insert the entry into an empty slot in the proctor pool 640. In some embodiments, proctor users may be added to the proctor pool 640 in the sequence in which their acceptances of the request are received by the proctor manager 620. Once the proctor pool 640 is sufficiently large and filled, proctor users attempting to accept the request may be notified that the pool 640 is full and new proctors are not required at this time.

Once a candidate user is allocated the requisite number of compatible proctor users, as described in various embodiments above, the examination process proceeds into the examination phase, wherein the platform distributes the exam materials to the registered, validated candidate users, the candidate users take the exam, and the allocated proctor users monitor the candidate users during the test-taking.

As noted above, in some embodiments the platform may additionally or alternatively allocate computing resources that implement AI proctors. AI proctors may be substitutes for human proctors in some situations, and may augment a human proctor's monitoring abilities in other situations. For example, the platform may include one or more machine learning engines that may be trained to observe candidate users as they undertake testing. Based upon analysis of the candidate user's activity, high-risk (e.g., potential for cheating or IP theft) activity can be identified and flagged. Additionally, one or more alerts may be generated when such activity is identified. The learning algorithms of machine learning engines can be developed to increase leverage of human proctors by relying primarily on AI proctors to perform certain tasks with high reliability. Then, based upon trust scores of candidate users or the detection of high-risk events occurring during a testing event, human proctors can be added to a candidate user's session to provide supplementary proctoring oversight.

Machine learning or other automated processing may additionally be used to create a "chain of identification" while the candidate user is being monitored. The chain of identification may be created and used during extended monitoring periods, such as the examination phase, to continuously validate the identity of the candidate user—specifically, that the person sitting at the client device and taking the exam is still the candidate user himself. Referring again to FIGS. 3-4B, the example platforms 300, 400 are described as collecting data from the client device 306A, 406 of the candidate user during the registration and greeting phases, and validating the data against internal and external data sources. Similar processes may be executed additionally or alternatively during the examination phase. TABLE 2 lists some general example tasks that AI proctors may be trained to perform once, periodically, or continuously during the registration, greeting, and/or examination phases. In some embodiments, systems of the platform may include (e.g., store in memory) decision logic executable by processors of the system; the AI proctors may follow the decision logic to perform the tasks. For example, the decision logic may include one or more image processing algorithms for matching a subject across a plurality of images, and the system may execute the decision logic to identify the subjects of multiple images and compare them to each other. The decision logic may further include one or more image processing algorithms for validating properties of an image subject. For example, the system may perform the image processing algorithms to determine whether an item (e.g., an identification document) or presentation (e.g., a position and orientation of a person, with respect to the image capture device) depicted in an image is the correct item expected. The system may combine the image algorithms to process certain compositions of an image. For example, the system may receive an image in response to a prompt that the user present an identification document to the video camera; the image may include a view of the user as well as a depiction of a presented document (e.g., side-by-side). The system may determine that the image includes a first portion depicting the view of the user and second portion depicting the presented document; the system may extract the second portion of the first image and determine, based on stored information depicting one or more acceptable identification documents, that the presented document is the identification document. The system may further determine that the presented document identifies the candidate user, and can extract the photo ID portion of the identification document for other identification processes.

TABLE 2

Example AI Proctor Tasks

| Task | Description |
|---|---|
| Face Comparison | Does the headshot match the ID picture, match the person sitting in front of the webcam? |
| Gaze detection | Is the candidate looking anywhere except at the computer |
| Audio detection | Enforce no talking rules |
| Image quality | Are candidate supplied photos of high enough quality? (e.g., not blurry) |
| Image subject | Is the candidate supplied photo of the right item? (e.g., is headshot a headshot, and ID an ID) |
| Workspace & room scanning | Does the candidate's room and workspace comply with rules |

In one embodiment, the platform (e.g., via security and integration components 308, 408 of the platforms 300, 400) or a related system may periodically generate images of the candidate user, such as by extracting frames of a live video feed captured during the examination phase and/or any of the pre-examination phases by a video capture device, such as the webcam of the client device or another video capture device monitoring the testing environment. The platform may execute one or more image processing algorithms to ensure that the generated images are all generally similar (e.g., similar front views of the candidate showing ears, eyes, nose, and mouth), and further to perform identity verification of the person using the client device. In some embodiments, a first identity verification may take place before the examination (i.e., the examination phase) begins: the system may obtain one of the frames of the live feed and compare it to an image known to depict the candidate user, such as a headshot portrait associated with the candidate user's account. Additionally or alternatively to comparing internally generated images (i.e., stored in internal data stores of the platform), the platform may obtain historical images of the candidate user that are stored in external data stores, such as school, employer, or government databases, or social media network services. For example, the system may query the external data stores for images of the candidate user, using identifying information of the candidate user. As described above, in some embodiments the external data store may be, or may be accessed through, a user data provider with which the candidate user has a user account; the candidate user may provide the system with login credentials that the system uses to access and/or send requests to the user data provider. If the image (i.e., the frame from the live feed) is confirmed to be depicting the candidate user using the client device, the system may allow the examination to begin. Then, during the examination, the platform may continue to receive the live feed, and the identity verification may be performed again once, or multiple times randomly or at predefined intervals, or substantially continuously. The current image extracted from the live feed may be compared to any image known to depict the candidate user, such as the headshot portrait associated with the user account, the live feed frame used to perform the first identity verification, or any of the preceding verified images captured during the examination and used to create the chain of identification. For example, at each interval the system may obtain one of the frames from the live feed having the current time stamp, and may compare the frame to the previous frame extracted at the immediately preceding interval to verify the candidate user's identity. In some embodiments, the system may perform the identity verification by measuring a likelihood that the user of the client device is the candidate user. Failure to achieve a predetermined threshold for "likelihood," such as a threshold degree of similarity between compared images or other data elements, may indicate that the identity of the person sitting at the client device has changed. In response to a failed identity verification, the system may take one or more corrective actions, such as stopping the examination, generating an alert to a human proctor to confirm the identity of the user of the client device, generating a behavior alert or a testing environment alert that can be used to decrease the candidate user's trust score, or another action associated with a potential cheating incident.

In addition or alternatively to continuously verifying a user's identity using image analysis, the platform may collect biometric data from the client device continuously or periodically during the exam, and may compare the collected biometric data to historical candidate data that can be used to identify the candidate user, such as stored biometric data including identifying markers identified from previous user input submitted to the platform by the candidate user (e.g., during a previous examination, or during a registration process). If the comparison produces a match (indicating, e.g., that the user has the identifying markers), the system generates a current identity verification, and produces a failed identity verification if not. The client device may be equipped with identity-gathering hardware, such as biometric sensors and other devices. In some embodiments, biometric data may include data obtained from standard equipment, such as standard input devices and image capture devices associated with the client device (e.g., with a platform software application installed thereon). For example, the platform may collect keystroke data from a client device keyboard and analyze the keystroke data for identifying markers, such as speed, accuracy, rhythm, and other keystroke dynamics, derived from the manner in which the user of the client device types on the keyboard; thus, if the user is typing much faster than a previously recorded median typing speed of the candidate user, the user may not be the candidate user. In another example, the platform may analyze images (e.g., frames from a video feed) depicting a user's hands to determine if the hands match existing data (e.g., images, medical information, descriptive details in text, other identifying information) identifying the authorized user's hands. In another embodiment, the client device may be connected to a dedicated exam keyboard and mouse that records a candidate user's fingerprints throughout the examination; the dedicated keyboard and/or mouse may send biometric data comprising the recorded fingerprint data to the platform, either directly or through the client device, and the system may receive the recorded fingerprint data and compare them to stored fingerprint data of the candidate user. In some embodiments, the dedicated keyboard and mouse may be provided (e.g., via rental) to the candidate user from the service provider of the platform. During the exam, the user's biometric data may be periodically recorded and transmitted to the platform. The sequence of gathered biometric data may additionally or alternatively include historical values gathered during registration/greeting, or captured from appropriate third party databases. The sequence of gathered data can then be analyzed to ensure that the identity of the candidate user has not changed during the exam.

In some embodiments, proctor users, or other users or AI directed to identify high-risk or cheating behavior, may be incentivized to flag such behavior through "gamification" of the monitoring process. In some embodiments, the platform may facilitate translation of a video feed from a candidate user's client device into a gaming environment. In one embodiment, the video feed or visible elements thereof may be simplified into simple geometric shapes. For example, the candidate user's pupils may be identified and simplified to geometric points. In another example, portions of the candidate user's body (e.g., head, neck, torso, arms, and/or hands) may be simplified into coordinated geometric shapes representing a stick-figure configuration. In yet another example, regions of the candidate user's testing space depicted in the video feed, such as a desk, papers, etc., can be simplified into rectangular or other geometric shapes. These examples may be combined with each other, and with other image processing approaches, to generate a geometrically simplified video feed.

The simplification of the video feed may employ various suitable image processing techniques, including those described above to perform testing environment validation processes. Image manipulation techniques, such as desaturation, object bounding, and obfuscation, may also be used to simplify the video feed. Once simplified, the generated images incorporating the geometrical shapes may be incorporated into a gaming environment, in which the proctor user or another user looks for simple patterns or actions that may, in turn, be indicative of a cheating or IP theft event. For example, simple patterns may be reflected in the movement of the geometric shapes, such as the geometric representations of the candidate user's pupils repeatedly moving to a specific location on the screen, indicating an abnormal focus of attention. In one embodiment, the simplified sequence of images may be displayed in a GUI that enables the proctor user to click on a "flag" button every time the proctor user observes a pattern or action associated with a cheating event. Additional game elements may be incorporated into the images to incentivize the proctor user to participate. Notably, once the video feed is gamified, the individual "playing the game" may be unaware that the geometrical shapes being displayed are associated with a candidate taking an exam. The true sources of the image data could be significantly obfuscated to improve the attractiveness of the game and reduce potential for candidate personal identifying information to be distributed as part of the gaming system.

Figure 7:
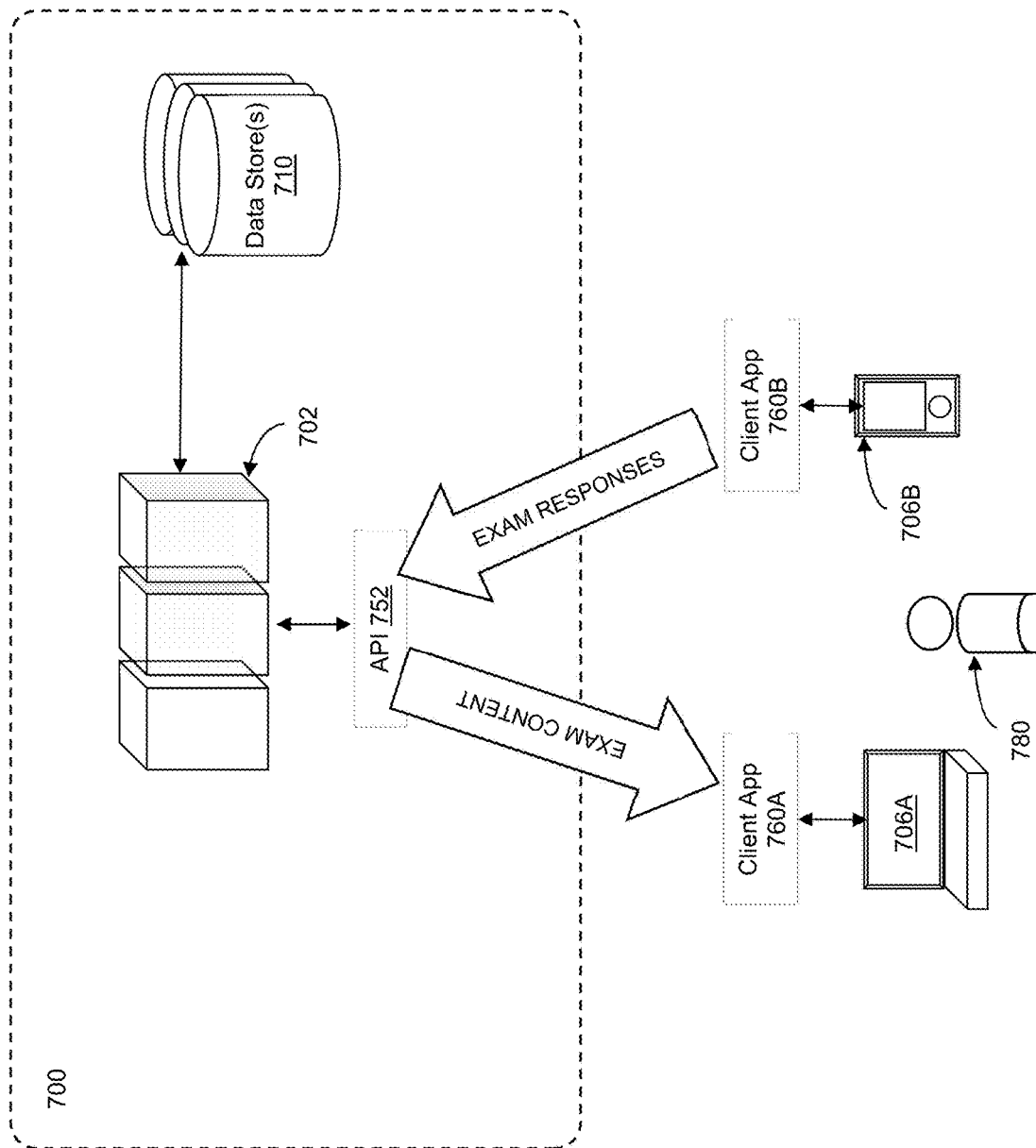
FIG. 7 is a system level block diagram of another example embodiment of an online proctored examination platform that dissociates client devices for conducting examinations in accordance with the present disclosure.

One known issue related to IP theft is that, in remote environments, there is little or no ability to prevent a bad actor from splitting the platform's video signal off of the client device (e.g., a convention desktop monitor) to another display device that can record the video content, which may include exam materials. FIG. 7 illustrates an online proctoring platform 700, similar to the platform 150 illustrated in FIG. 1B. In particular, like FIG. 1B, the platform 700 may be configured to enable a candidate user 780 to connect to the platform 700 (e.g., via an API 752) using two distinct client devices 706A,B. Advantageously, for candidate users 780 having multiple available computing devices (e.g., computer system, mobile device, gaming system, etc.), the platform 700 may be configured to disassociate the client device 706A used to display exam content from the client device 706B used to gather candidate user input (i.e., answers). This allows the exam content to be displayed on a client device 706A that renders it relatively difficult to steal exam content (e.g. by splitting or redirecting video input), such as a smartphone or tablet computer, while the answer submissions and other interactions are performed on the other client device 706B.

In one embodiment, the disassociated arrangement may be facilitated by registering both client devices 706A,B to the candidate user on the platform 700. Additionally, platform software 760A,B may be installed on each client device 706A,B. The platform software 760A,B installations may not be identical, instead including the libraries and instructions that 1) enable execution on the particular type of client device 706A,B, and 2) provide one client device 706A with the functionality to display exam content, and the other client device 706B with the functionality to receive user input comprising responses to examination questions. Nevertheless, the platform software 760A,B may secure each of the client devices 706A,B when the exam begins, as described above. Further, in operation, the platform 700 may send exam content to the first client device 706A for display, but may not receive any data from the first client device 706A. The platform 700 may then receive user input from the second client device 706B comprising responses to the exam questions, and may process the user input accordingly.

In some embodiments, the candidate user 780 may access the platform 700 with multiple devices 706A,B from home. In other embodiments, the candidate user 780 may take the devices 706A,B to a "bring your own device" (BYOD) testing facility, and access the platform 700 and take the exam from the facility. The BYOD testing facility may, in some embodiments, be analogous to a standard testing facility, including in-person check-in and validation processes and private testing cubicles or other structures, except that the candidate user 780 can use his own devices 706A,B instead of hardware provided by the facility. Advantageously, this allows the candidate user 780 to use devices 706A,B that he is familiar with, while also streamlining testing facility operations because the facility does not need to provide and maintain testing hardware. In other embodiments, the BYOD testing facility may be implemented in a shared facility, such as a co-working space. In such an environment where there are likely to be people and other distractions in the candidate user's testing environment, the platform 700 may perform additional (or more restrictive) testing environment validation processes (as described above, and see FIGS. 4A-B).

Access to a BYOD facility may be limited based upon candidate user attributes, such as the trust score associated with a particular candidate user—low trust scores may require the candidate user to go to a more conventional facility. Thus, the platform 700 (e.g., using the servers 702 and internal data stores 710 as described above) may authorize the candidate user 780 to take an exam from a BYOD facility, preferably during the registration phase, which may take place before the candidate user 780 travels to the BYOD facility. Alternatively, the candidate user 780 may be authorized or declined at the BYOD facility itself.

In some embodiments, a BYOD testing facility or another, more conventional testing facility (such as shared testing space 130 of FIG. 1A) may be provided with a set of pre-installed cameras for monitoring candidate users during a practical exam. The cameras may generate a recording that is transferred to the online proctoring platform (e.g., platform 700). A proctor user may be allocated to evaluate the recording. By separating the recording and evaluation functions, the present systems and methods may convert a practical exam into an online proctored exam. A similar proctoring experience may be implemented in the case of a virtual reality practical examination, where one or both of the candidate user and the proctor user select virtual reality devices as their client devices.

Figure 8:
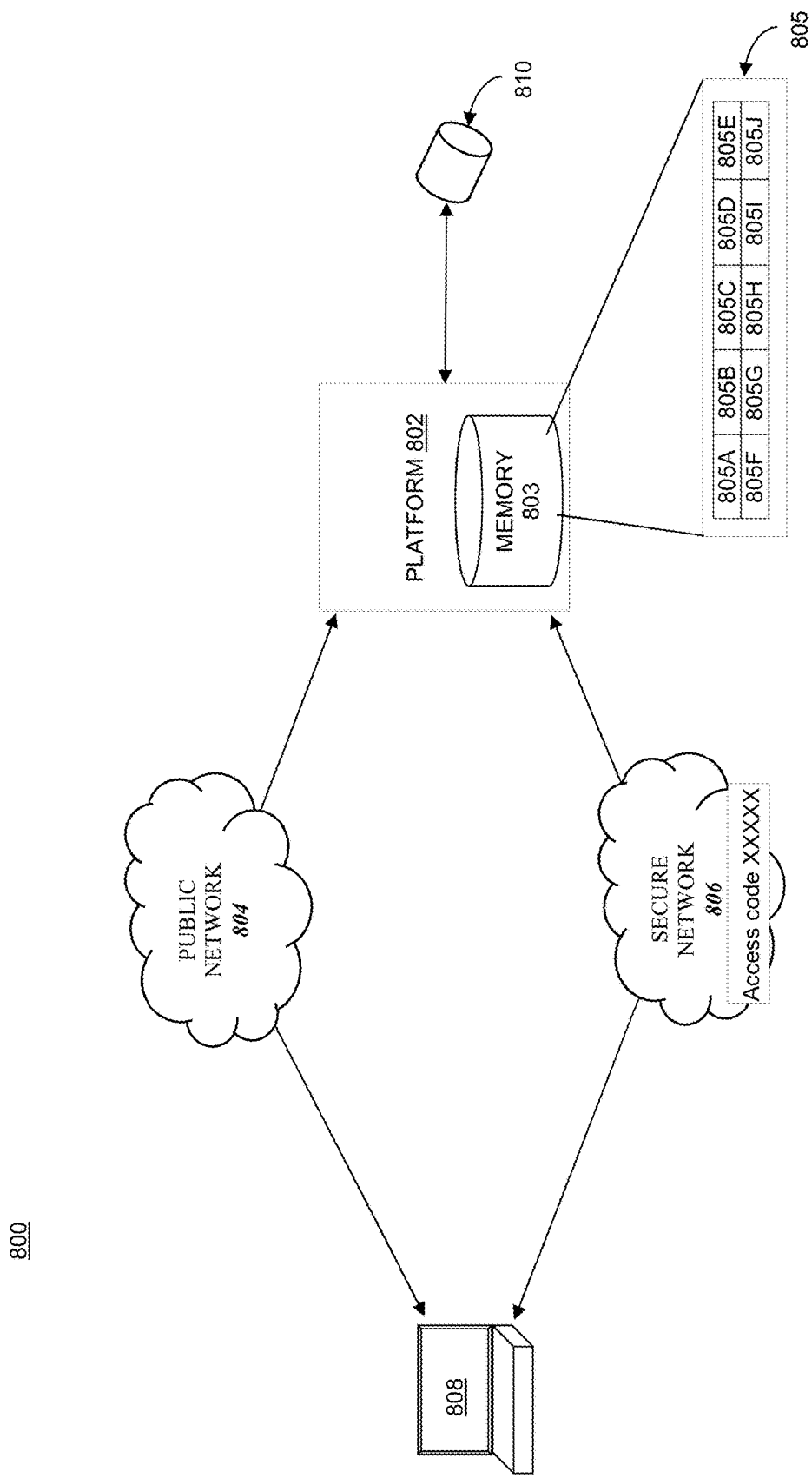
FIG. 8 is a block diagram depicting an example system that may operate in a testing facility to enable a candidate to bring their own device for the purpose of engaging in an evaluation activity.

FIG. 8, for example, depicts components of an example system 800 that may operate in a testing facility that may enable a candidate to bring their own devices for the purposes of engaging in an evaluation activity. Environment 800 includes a candidate evaluation platform 802 implemented by one or more computing devices configured in accordance with the present disclosure. Platform 802 is configured to receive requests for evaluation services from one or more candidate devices and then deliver evaluation services (e.g., greeting and evaluation services as described herein) to those candidate devices. Candidate responses may then be gathered by platform 802 for the purpose of candidate evaluation.

System 800 includes two different communication networks that are connected to platform 802. Network 804 is a public network. Conversely, network 806 is a secure local area network (LAN). Devices may only connected to network 806 if they are provided with an appropriate credential, such as a network key, enabling the device to communicate securely via network 806.

Generally, when undergoing an evaluation process, a candidate's device (e.g., candidate device 808) connects to public network 804 to undergo initial communications with platform 802. Once connected to network 804, candidate device 808 transmits a request to access an evaluation service offered by platform 802. Candidate device 808 may encode into the request information describing the candidate, such as a candidate identifier.

Platform 802 receives the request from candidate device 808. Using the candidate identifier included into the request, platform 802 identifies the candidate and, according to methods and approaches described herein, determines a trust score for the candidate. The candidate's trust score is an indicator that may be used to predict the likelihood that the candidate will undergo inappropriate behavior during an evaluation activity (e.g., cheating or content theft). In some cases, the trust score may be referred to ask a risk factor, which indicates the likelihood that a candidate will undergo inappropriate behavior (e.g., cheating or content theft) during an evaluation activity.

If the candidate's trust score is too low (indicating the candidate is untrustworthy), the candidate may be denied access to the evaluation service. When denying the candidate, platform 802 may identify (e.g., via a lookup table stored in memory 803 of platform 802) an alternative location (e.g., an alternative higher security testing facility) where the candidate may undergo the evaluation activity and transmit a message to candidate device 808 identifying that location (or otherwise notifying the candidate of the location). Alternatively, platform 802 may notify the candidate that the candidate cannot undergo the evaluation activity using candidate device 808 and must instead undergo the activity using one of the testing facilities in-house computing devices.

But if the candidate's trust score is sufficiently high (indicating a trustworthy candidate), the candidate may be authorized to undergo the requested evaluation activity using candidate device 808. In that case, platform 802 may transmit a credential to candidate device 808 via network 804 enabling candidate device 808 to initiate the evaluation activity. In an embodiment, this may include platform 802 transmitting a credential to candidate device 808 that enables candidate device 808 to connect to secure network 806 for the purpose of accessing the evaluation activity.

Additionally, when initiating the evaluation activity, platform 802 may identify a suitable physical location (e.g., a particular desk, booth, room, cubicle, or the like) in which the candidate can undergo evaluation. Platform 802 may identify the location by accessing, within memory 803, a map 805 of locations within the testing facility to identify an available location. As various candidates undergo evaluation, platform can update, within memory 803, an indication of whether each of locations 805a-805j is in-use.

After identifying available location 805a, platform 802 transmits a message to candidate device 808 (or otherwise notifies the candidate) identifying which location has been assigned to the candidate. The candidate is then instructed to move to that location to begin the evaluation process.

At or about the time the candidate is notified of the candidate's assigned location for evaluation, platform 802 may automatically access one or more data recording devices (e.g., camera 810) in proximity to the candidate's assigned location to initiate recording (e.g., of video or audio) of the environment of the location. Typically, platform 802 will include a number of data recorders, including cameras and audio recorders that may each be allocated to or associated with one or more of the locations 805 for the purpose of monitoring a candidate's actions while undergoing the evaluation process in such a location.

After initiating the recording, platform 802 may cause all or part of the recorded data to be transmitted to a proctor's computing device, thereby enabling the proctor to monitor the candidate's activities during the evaluation process according to the methods and approaches described herein.

Other embodiments of testing equipment for use with the present online proctored examination platforms are intended to accommodate candidate users with poor internet connections. In one embodiment, a comprehensive "test center in a box" may be shipped to a candidate user. Techniques such as drones may be used to deliver the computer system to a remote candidate user. Similarly, ad hoc networking approaches (e.g., Facebook's Internet in the sky) could be used to provide connectivity to a candidate that may not have a reliable connection. The test center may include computing devices, video capture devices, and LTE or other wireless connectivity hardware. The examination materials and platform software may be pre-loaded onto the computing device(s). The candidate user can then take the exam; when the exam is finished, the hardware is shipped back. In another embodiment, the comprehensive test center does not include wireless connectivity hardware. The computer system is preloaded with the test content, as well as a system configured to provide registration and greeting functionality. The candidate user takes the exam offline, and is recorded doing so. Optionally, the system may incorporate an AI proctor to provide at least some level of proctoring during the offline exam. When the exam is finished and the computer system is returned, a human proctor can review the video content to identify potential issues arising during the testing event.

When an exam is complete, implementations of the platform as described above may finalize the examination process by compiling examination results and storing them internally and/or reporting them to third party service providers or systems that are authorized to receive completed examination data of the candidate user. In some embodiments, the examination results, and any other data to be sent to the third party system, may be compiled into a format that is readable by the third party system. For example, the examination results may be formatted as an XML file. Additionally, the platform may perform various analyses of the exam results, recordings of the exam, feedback from the proctor users and/or the candidate user, and the like. In some embodiments, the platform may be configured to perform non-cognitive assessments of the collected data, such as evaluating the candidate user's creativity (e.g., via machine learning). In some embodiments, finalizing the examination process includes updating trust scores for users involved in the examination process, including candidate users, administrative users, and/or proctor users. The updated trust score may be packaged into a format recognizable by one or more particular third party systems (e.g., of an employer of the candidate user), and reported, on its own or together with the examination results, to the third parties. For example, the system may send only the examination results if the updated trust score is above a first threshold, and may send the examination results and the updated trust score if the updated trust score is below the first threshold. In some embodiments, if the updated trust score is very low (i.e., below a predetermined second threshold that is lower than the first threshold), the system may also share other assets captured during the examination process, such as video, audio, exam results, alerts generated, and other data. The system may compile this collected data together with the examination results and the updated trust score into the formatted completed examination data, and send it to the third party system.

In an embodiment, a system includes a candidate client device including a processor configured to implement a candidate evaluation software application, a camera configured to record a sequence of images of an environment of the candidate client device, and a microphone configured to record audio data in the environment of the candidate client device. The system includes one or more server hardware computing devices communicatively coupled to a network and in communication, via the network, with the candidate client device. Each of the one or more server hardware computing devices includes at least one processor executing specific computer-executable instructions within a memory that, when executed, cause the one or more server hardware computing devices to receive the sequence of images and the audio data from the candidate client device, extract a first video attribute from the sequence of images, extract a first audio attribute from the audio data, determine that at least one of the first video attribute violates a first video condition and the first audio attribute violates a first audio condition, and prevent the candidate client device from performing a candidate evaluation function using the candidate evaluation software application.

In another embodiment, a system includes a server computer communicatively coupled to a network and in communication, via the network, with a candidate client device. The candidate client device includes a data capture device configured to record data from an environment of the candidate client device. The server computer is configured to receive, via the network, the data from the environment of the candidate client device, extract a first attribute from the data, determine that the first attribute violates a first condition, and generate an alert indicating that the candidate client device is in an unsuitable testing environment.

In another embodiment, a method includes receiving, via a network, data captured from an environment of a candidate client device. The candidate client device includes a data capture device configured to record the data from the environment of the candidate client device. The method includes extracting a first attribute from the data, determining that the first attribute violates a first condition, and generating an alert indicating that the candidate client device is in an unsuitable testing environment.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising: a candidate client device including:
   a processor configured to implement a candidate evaluation software application,
   a camera configured to record a sequence of images of an environment of the candidate client device, and
   a microphone configured to record audio data in the environment of the candidate client device; and
   one or more server hardware computing devices communicatively coupled to a network and in communication, via the network, with the candidate client device, and each comprising at least one processor executing specific computer-executable instructions within a memory that, when executed, cause the one or more server hardware computing devices to:
   receive the sequence of images and the audio data from the candidate client device,
   extract a first video attribute from the sequence of images,
   extract a first audio attribute from the audio data, implement a machine learning engine to determine that the first video attribute or the first audio attribute violates a first condition by determining, based on a feature vector including a plurality of features that are extracted from the sequence of images and the audio data, that the candidate client device is in an unsuitable testing environment, and
   prevent the candidate client device from performing a candidate evaluation function using the candidate evaluation software application.

2. The system of claim 1, wherein the one or more server hardware computing devices is further configured to:
   access historical candidate data to determine a risk factor for a candidate associated with the candidate client device; and
   before determining that at least one of the first video attribute violates a first video condition and the first audio attribute violates a first audio condition, determine that the risk factor exceeds a threshold.

3. The system of claim 1, wherein the first audio attribute is an average volume level of the audio data in a frequency range that does not include frequencies less than 50 Hertz and greater than 300 Hertz and wherein the at least one processor is configured to determine that the first audio attribute violates the first audio condition by determining the average volume level exceeds a volume level threshold indicating an unsuitable testing environment.

4. The system of claim 1, wherein the first video attribute is a luminance value or contrast ratio of at least one image in the sequence of images and wherein the at least one processor is configured to determine that the first video attribute violates the first video condition by determining the luminance value falls below a first luminance threshold value indicating an unsuitable testing environment or the contrast ratio falls below a first contrast ratio threshold value indicating an unsuitable testing environment.

5. A system, comprising:
a server computer communicatively coupled to a network and in communication, via the network, with a candidate client device, the candidate client device including a data capture device configured to record data from an environment of the candidate client device, the server computer being configured to:
receive, via the network, the data from the environment of the candidate client device, extract a first attribute from the data,
implement a machine learning engine to determine that the first attribute violates a first condition by determining, based on a feature vector including a plurality of features that are extracted from the data from the environment of the candidate client device that the candidate client device is in an unsuitable testing environment, and
generate an alert indicating that the candidate client device is in an unsuitable testing environment.

6. The system of claim 5, wherein the server computer is configured to:
access historical candidate data to determine a trust score for a candidate associated with the candidate device; and
before determining that the first attribute violates a first condition, determine that the trust score falls below a threshold.

7. The system of claim 5, wherein the data from the environment of the candidate client device includes a sequence of images and audio data and the plurality of features includes at least a luminance value of at least one image from the sequence of images, a contrast ratio value of at least one image in the sequence of images, and an average volume level of the audio data.

8. The system of claim 5, wherein the data from the environment of the candidate client device includes a sequence of images and the server computer is configured to extract a first attribute from the data by determining a luminance value of at least one image in the sequence of images and determine that the first attribute violates the first condition by determining the luminance value exceeds a first luminance value indicating an unsuitable testing environment or falls below a second luminance value indicating the unsuitable testing environment.

9. The system of claim 5, wherein the data from the environment of the candidate client device includes a sequence of images and the server computer is configured to extract a first attribute from the data by determining a contrast ratio value of at least one image in the sequence of images and determine that the first attribute violates the first condition by determining the contrast ratio value exceeds a first contrast ratio value indicating an unsuitable testing environment or falls below a second contrast ratio value indicating the unsuitable testing environment.

10. The system of claim 5, wherein the data from the environment of the candidate client device includes audio data and the server computer is configured to extract the first attribute from the data by determining an average volume level of the audio data and determine that the first attribute violates the first condition by determining the average volume level exceeds a volume level threshold indicating an unsuitable testing environment.

11. The system of claim 10, wherein the server computer is configured to determine the average volume level of the audio data by determining an average volume level of the audio data in a frequency range that does not include frequencies less than 50 Hertz and greater than 300 Hertz.

12. A method, comprising:
receiving, via a network, data captured from an environment of a candidate client device, the candidate client device including a data capture device configured to record the data from the environment of the candidate client device;
extracting a first attribute from the data; implementing a machine learning engine to determine that the first attribute violates a first condition; and
generating an alert indicating that the candidate client device is in an unsuitable testing environment.

13. The method of claim 12, wherein implementing the machine learning engine to determine that the first attribute violates the first condition further comprises determining, based on a feature vector including a plurality of features that are extracted from the data from the environment of the candidate client device, whether the candidate client device is in an unsuitable testing environment.

14. The method of claim 13, wherein the data from the environment of the candidate client device includes a sequence of images and audio data and the plurality of features includes at least a luminance value of at least one image from the sequence of images, a contrast ratio value of at least one image in the sequence of images, and an average volume level of the audio data.

15. The method of claim 12, wherein the data from the environment of the candidate client device includes a sequence of images and further comprising extracting the first attribute from the data by determining a luminance value of at least one image in the sequence of images and determining that the first attribute violates the first condition by determining the luminance value exceeds a first luminance value indicating an unsuitable testing environment or falls below a second luminance value indicating the unsuitable testing environment.

16. The method of claim 12, wherein the data from the environment of the candidate client device includes a sequence of images and further comprising extracting the first attribute from the data by determining a contrast ratio value of at least one image in the sequence of images and determining that the first attribute violates the first condition by determining the contrast ratio value exceeds a first contrast ratio value indicating an unsuitable testing environment or falls below a second contrast ratio value indicating the unsuitable testing environment.

17. The method of claim 12, wherein the data from the environment of the candidate client device includes audio data and further comprising extracting the first attribute from the data by determining an average volume level of the audio data and determining that the first attribute violates the first condition by determining the average volume level exceeds a volume level threshold indicating an unsuitable testing environment.

18. The method of claim 17, wherein determining the average volume level of the audio data further comprises determining an average volume level of the audio data in a frequency range that does not include frequencies less than 50 Hertz and greater than 300 Hertz.

* * * * *